US012706795B2

(12) United States Patent
Feng et al.

(10) Patent No.: US 12,706,795 B2
(45) Date of Patent: Aug. 11, 2026

(54) COMMUNICATION METHOD AND APPARATUS

(71) Applicant: HUAWEI TECHNOLOGIES CO., LTD., Shenzhen (CN)

(72) Inventors: Qi Feng, Shanghai (CN); Yuanzhou Hu, Shanghai (CN); Huang Huang, Shenzhen (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/675,101

(22) Filed: May 27, 2024

(65) Prior Publication Data

US 2024/0323073 A1 Sep. 26, 2024

Related U.S. Application Data

(63) Continuation of application No. PCT/CN2022/134193, filed on Nov. 24, 2022.

(30) Foreign Application Priority Data

Nov. 25, 2021 (CN) ........................ 202111417858.4

(51) Int. Cl.
*H04L 27/34* (2006.01)
*H04L 25/03* (2006.01)

(52) U.S. Cl.
CPC .... *H04L 27/3405* (2013.01); *H04L 25/03834* (2013.01)

(58) Field of Classification Search
CPC ...................... H04L 27/3405; H04L 25/03834
See application file for complete search history.

(56) References Cited

U.S. PATENT DOCUMENTS

| | | | | |
|---|---|---|---|---|
| 6,343,101 | B1 * | 1/2002 | Dong | H04B 14/04 375/242 |
| 6,611,567 | B1 * | 8/2003 | Balakrishnan | H04L 27/20 375/298 |
| 2012/0201221 | A1 * | 8/2012 | Mochida | H04L 27/2672 370/329 |
| 2012/0250748 | A1 | 10/2012 | Nguyen et al. | |
| 2016/0182201 | A1 * | 6/2016 | Jiang | H04L 5/0048 |
| 2018/0062673 | A1 * | 3/2018 | Sjödin | H04B 1/1027 |
| 2019/0052403 | A1 * | 2/2019 | Oveis Gharan | H03M 13/2948 |

(Continued)

OTHER PUBLICATIONS

IEEE Computer Society:"IEEE Standard for High Data Rate Wireless Multi-Media Networks Amendment 2: 100 Gb/s Wireless Switched Point-to-Point Physical Layer." IEEE Std 802.15.3d—2017. Sep. 28, 2017. total 55 pages.

(Continued)

*Primary Examiner* — Janice N Tieu

(57) ABSTRACT

A communication method and apparatus belonging to the NR or LTE field, to improve spectral efficiency of an ultra-high frequency band. The method includes: a first apparatus generates and sends a first signal. The first signal is a signal obtained by performing deceleration modulation on a symbol, and a time interval between two symbols that undergo deceleration modulation is greater than a time interval between the two symbols that do not undergo deceleration modulation.

26 Claims, 11 Drawing Sheets

(56) References Cited

U.S. PATENT DOCUMENTS

2021/0243065 A1 8/2021 Ferdinand et al.

OTHER PUBLICATIONS

Intel Corporation: "Single carrier based waveform for high frequency bands above 40 GHz",3GPP Draft; R1-169493 BWSC-Single Carrier Based Waveform for High Frequency Bands Above 40 GHZ, 3rd Generation Partnership Project (3GPP), Mobile Competence Centre; 650, Route Deslucioles; F-069 vol. RAN WG1, No. Lisbon, Portugal; Oct. 10, 2016-Oct. 14, 2016Oct. 9, 2016 (Oct. 9, 2016).

IEEE Computer Society:"IEEE Standard forInformation technology Telecommunications and information exchange between systems Local and metropolitan area networks Specific requirements Part 15.4: Wireless Medium Access Control (MAC) and Physical Layer (PHY) Specifications for Low-Rate Wireless Personal Area Networks(WPANs) Amendment 1: Add Alternate PHY." IEEE Std 802.15.4a—2007. Aug. 31, 2007. total 203 pages.

Siclet Cyrille et al: "Improving Spectral Efficiency While Reducing PAPR Using Faster-Than-Nyquist Multicarrier Signaling", Apr. 5, 2017 (Apr. 5, 2017), SAT 2015 18th International Conference, Austin, TX, USA, Sep. 24-27, 2015; [Lecture Notes in Computer Science; Lect.Notes Computer], Springer, Berlin, Heidelberg, pp. 21-32, XP047410625, ISBN: 978-3-540-74549-5.

Nasarre Ismael Peruga et al EnhancedUplink Coverage for 5G NRFrequency-Domain Spectral Shaping With Spectral Extension, IEEE Open Journal of the Communications Society, IEEE vol. 2, May 21, 2021 (May 21, 2021), pp. 1188-1204, XP011857833, DOI10.1109OJCOMS.2021.3082688.

* cited by examiner

COMMUNICATION METHOD AND APPARATUS

CROSS-REFERENCE TO RELATED APPLICATIONS

This application is a continuation of International Application No. PCT/CN2022/134193, filed on Nov. 24, 2022, which claims priority to Chinese Patent Application No. 202111417858.4, filed on Nov. 25, 2021. The disclosures of the aforementioned applications are hereby incorporated by reference in their entireties.

TECHNICAL FIELD

The disclosure relates to the communication field, and in particular, to a communication method and apparatus.

BACKGROUND

In systems such as long term evolution (LTE) and new radio (NR), Nyquist signaling and faster-than-Nyquist (FTN) signaling are widely used to improve spectral efficiency. A transmission rate of Nyquist signaling (referred to as a Nyquist signaling rate below) is an ultimate transmission rate of intersymbol interference-free transmission. A transmission rate of FTN signaling is greater than the Nyquist signaling rate, but there is intersymbol interference.

However, in an ultra-high frequency band, for example, a sub-terahertz frequency band or a terahertz frequency band, Nyquist signaling or FTN signaling has a very high requirement on a processing speed of a digital-to-analog conversion (DAC) device and a analog-to-digital conversion (ADC) device. As a result, a hardware threshold is very high, and it is impossible to consider all types of hardware. In addition, to resist multipath interference, a cyclic prefix of a signal in the ultra-high frequency band is usually very long. Consequently, Nyquist signaling or FTN signaling cannot improve spectral efficiency, and on the contrary, reduces spectral efficiency.

SUMMARY

Embodiments of the disclosure provide a communication method and apparatus, to improve spectral efficiency of an ultra-high frequency band.

The following technical solutions are used in the disclosure.

According to a first aspect, a communication method is provided. The method includes: A first device generates a first signal, and sends the first signal. The first signal is a signal obtained by performing deceleration modulation on a symbol, and a time interval between two symbols that undergo deceleration modulation is greater than a time interval between the two symbols that do not undergo deceleration modulation.

It can be learned from the method according to the first aspect that, in an ultra-high frequency band, because power of a device is limited, increasing a time interval between symbols based on deceleration modulation does not reduce spectral efficiency. On the contrary, increasing the time interval between the symbols not only can reduce a signal-to-noise ratio, but also can effectively shorten a length of a cyclic prefix of a signal, thereby improving spectral efficiency of the ultra-high frequency band.

In a possible design solution, the first signal may be a signal obtained by performing deceleration modulation on the symbol based on a pulse shaping filter, that is, deceleration modulation of a single carrier is implemented.

Optionally, the first signal, the pulse shaping filter, and the symbol may meet the following relationship:

$$s(t) = \sum_{n=-CP}^{N-1} a_{n\,mod\,N}\, g(t - \alpha nT).$$

s(t) is the first signal, g(t) is an impulse response function of the pulse shaping filter, $a_n$ is an $n^{th}$ symbol, n is an integer ranging from −CP to N−1, CP is an index of a cyclic prefix, and CP may be an integer. A value of α is greater than 1, and a symbol transmission rate of deceleration modulation may be flexibly adjusted by adjusting a value of α. For example, if α is set to 2, deceleration modulation is represented by increasing a symbol time interval by two times; and if α is set to 3, deceleration modulation is represented by increasing the symbol time interval by three times, and so on. In addition, t is a time variable, and T is a time interval between two adjacent symbols.

In a possible design solution, the first signal may be a signal obtained by performing deceleration and spectrum shifting modulation on the symbol based on the pulse shaping filter. It can be understood that, deceleration modulation (for example, unipolar deceleration modulation) usually causes the first signal to have an impulse function (which is reflected as a peak characteristic on a spectrum). Spectrum shifting is performed on the first signal, so that the impulse function can be coherently superposed with a spectral side lobe of the first signal, thereby effectively suppressing or eliminating the peak characteristic of the spectrum, reducing an out-of-band leakage level of a signal, and improving signal quality.

Optionally, the first signal, the pulse shaping filter, and the symbol may meet the following relationship:

$$s(t) = \sum_{n=-CP}^{N-1} a_{n\,mod\,N}\, g(t - \alpha nT)\cos \pi(t - \alpha nT)/T_g.$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, T is a time interval between two adjacent symbols, $\frac{1}{2}T_g$ is a spectrum shifting amount, and $T_g$ is pulse duration of the pulse shaping filter. Generally, $T_g$ is far greater than T, that is, a spectrum shifting amount of the first signal is relatively small, so that a bandwidth increase of the first signal after spectrum shifting is very small, to ensure spectral efficiency.

In a possible design solution, the first signal may be a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers. In this way, deceleration modulation can be performed on a plurality of carriers.

Optionally, the first signal, the matrix of the extended Fourier transform, and the symbol may meet the following relationship:

$$s(t) = \sum_{k=-\frac{K}{2}}^{\frac{K}{2}-1} \sum_{n=0}^{N-1} a_n e^{-j2\pi kf(n)} e^{j2\pi k\Delta ft}; \text{ and}$$

$$-T_{cp} \le t < T_{sym}.$$

s(t) is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, Δf is a subcarrier spacing, $T_{cp}$ is duration corresponding to a cyclic prefix in the first signal, and $T_{sym}$ is duration corresponding to an original signal in the first signal.

For a multi-carrier signal, a ratio of K to N may be considered as a deceleration factor of the multi-carrier signal, and the first device may flexibly adjust a symbol transmission rate of deceleration modulation by adjusting a value of the deceleration factor. For example, if the ratio of K to N is set to 2, deceleration modulation is represented by increasing a symbol time interval by two times; and if the ratio of K to N is set to 3, deceleration modulation is represented by increasing the symbol time interval by three times, and so on.

Optionally, the first signal may be a signal obtained by performing deceleration modulation and phase rotation modulation on the symbol based on the matrix of the extended Fourier transform, and phase rotation amounts of different signals are different. To be specific, time division multiplexing of different signals is implemented by using sparseness of slower-than-Nyquist signaling in time domain, so that a multiple access manner is more flexible and communication efficiency is higher.

Optionally, the first signal may be an $m^{th}$ signal in M signals, and a phase rotation amount of the first signal may meet the following relationship:

$$\text{diag}\{1, e^{-j2\pi m/MN}, \ldots, e^{-j2\pi m(K-1)/MN}\}.$$

K is the quantity of rows in the matrix of the extended Fourier transform, and N is the quantity of columns in the matrix of the extended Fourier transform. In this way, it may be ensured that phase rotation amounts of different signals are different, a distance between different signals is relatively large, and intersymbol interference between different signals is relatively small. Therefore, signal quality can be improved.

In a possible design solution, the first signal may include a plurality of pilot blocks, phases of the plurality of pilot blocks are obtained through phase rotation, and phases of any two of the plurality of pilot blocks after rotation are different, to reduce multipath interference between pilot blocks and improve accuracy of channel estimation.

Optionally, the plurality of pilot blocks may be P pilot blocks, and a phase rotation amount of a $p^{th}$ pilot block in the P pilot blocks may meet the following relationship:

$$e^{-j\pi\mu p(p+1)/P}, 0 \le p \le P-1, \text{ and } 1 \le \mu \le P-1.$$

It can be learned from the foregoing relationship that phases of the P pilot blocks after rotation are relatively randomly distributed on a complex number plane. In this way, multipath interference between the P pilot blocks may also be relatively randomly distributed on a unit circle to suppress each other, to reduce multipath interference between pilot blocks. Further, when μ and P are relatively prime, the phases of the P pilot blocks after rotation may be relatively evenly distributed on the unit circle of the complex number plane. In this way, multipath interference between the P pilot blocks may also be relatively evenly distributed on the unit circle to be superposed and canceled, to further reduce multipath interference between pilot blocks.

According to a second aspect, a communication method is provided. The method includes: A second device receives a first signal, and demodulates the first signal. The first signal is a signal obtained by performing deceleration modulation on a symbol, and a time interval between two symbols that undergo deceleration modulation is greater than a time interval between the two symbols that do not undergo deceleration modulation.

In a possible design solution, the first signal may be a signal obtained by performing deceleration modulation on the symbol based on a pulse shaping filter.

Optionally, the first signal, the pulse shaping filter, and the symbol may meet the following relationship:

$$s(t) = \sum_{n=-CP}^{N-1} a_{n \bmod N} g(t - \alpha nT).$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, and T is a time interval between two adjacent symbols.

In a possible design solution, the first signal may be a signal obtained by performing deceleration and spectrum shifting modulation on the symbol based on the pulse shaping filter.

Optionally, the first signal, the pulse shaping filter, and the symbol may meet the following relationship:

$$s(t) = \sum_{n=-CP}^{N-1} a_{n \bmod N} g(t - \alpha nT) \cos \pi (t - \alpha nT)/T_g.$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, T is a time interval between two adjacent symbols, $\frac{1}{2}T_g$ is a spectrum shifting amount, and $T_g$ is pulse duration of the pulse shaping filter.

In a possible design solution, the first signal may be a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

Optionally, the first signal, the matrix of the extended Fourier transform, and the symbol may meet the following relationship:

$$s(t) = \sum_{k=-\frac{K}{2}}^{\frac{K}{2}-1} \sum_{n=0}^{N-1} a_n e^{-j2\pi k f(n)} e^{j2\pi k \Delta f t}; \text{ and}$$

$$-T_{cp} \le t < T_{sym}.$$

s(t) is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, Δf is a subcarrier spacing, $T_{cp}$ is duration corresponding to a cyclic prefix in the first signal, and $T_{sym}$ is duration corresponding to an original signal in the first signal.

Optionally, the first signal may be a signal obtained by performing deceleration modulation and phase rotation modulation on the symbol based on the matrix of the extended Fourier transform, and phase rotation amounts of different signals are different.

Optionally, the first signal may be an $m^{th}$ signal in M signals, and a phase rotation amount of the first signal may meet the following relationship:

$$\text{diag}\{1, e^{-j2\pi m/MN}, \ldots, e^{-j\pi m(K-1)/MN}\}.$$

K is the quantity of rows in the matrix of the extended Fourier transform, and N is the quantity of columns in the matrix of the extended Fourier transform.

In a possible design solution, the first signal may include a plurality of pilot blocks, phases of the plurality of pilot blocks are obtained through phase rotation, and phases of any two of the plurality of pilot blocks after rotation are different.

Optionally, the plurality of pilot blocks may be P pilot blocks, and a phase rotation amount of a $p^{th}$ pilot block in the P pilot blocks may meet the following relationship:

$$e^{-j\pi\mu p(p+1)/P}, 0 \le p \le P-1, \text{ and } 1 \le \mu \le P-1.$$

In addition, for technical effects of the method according to the second aspect, refer to the technical effects of the method according to the first aspect. Details are not described herein again.

According to a third aspect, an embodiment of the disclosure provides a communication apparatus. The apparatus includes a processing module and a transceiver module. The processing module is configured to generate a first signal, and the transceiver module is configured to send the first signal. The first signal is a signal obtained by performing deceleration modulation on a symbol, and a time interval between two symbols that undergo deceleration modulation is greater than a time interval between the two symbols that do not undergo deceleration modulation.

In a possible design solution, the first signal may be a signal obtained by performing deceleration modulation on the symbol based on a pulse shaping filter.

Optionally, the first signal, the pulse shaping filter, and the symbol may meet the following relationship:

$$s(t) = \sum_{n=-CP}^{N-1} a_{n \bmod N} g(t - \alpha nT).$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, and T is a time interval between two adjacent symbols.

In a possible design solution, the first signal may be a signal obtained by performing deceleration and spectrum shifting modulation on the symbol based on the pulse shaping filter.

Optionally, the first signal, the pulse shaping filter, and the symbol may meet the following relationship:

$$s(t) = \sum_{n=-CP}^{N-1} a_{n \bmod N} g(t - \alpha nT) \cos \pi (t - \alpha nT) / T_g.$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, T is a time interval between two adjacent symbols, $\frac{1}{2}T_g$ is a spectrum shifting amount, and $T_g$ is pulse duration of the pulse shaping filter.

In a possible design solution, the first signal may be a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

Optionally, the first signal, the matrix of the extended Fourier transform, and the symbol may meet the following relationship:

$$s(t) = \sum_{k=-\frac{K}{2}}^{\frac{K}{2}-1} \sum_{n=0}^{N-1} a_n e^{-j2\pi k f(n)} e^{j2\pi k \Delta f t}; \text{ and}$$

$$-T_{cp} \le t < T_{sym}.$$

s(t) is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, Δf is a subcarrier spacing, $T_{cp}$ is duration corresponding to a cyclic prefix in the first signal, and $T_{sym}$ is duration corresponding to an original signal in the first signal.

Optionally, the first signal may be a signal obtained by performing deceleration modulation and phase rotation modulation on the symbol based on the matrix of the extended Fourier transform, and phase rotation amounts of different signals are different.

Optionally, the first signal may be an $m^{th}$ signal in M signals, and a phase rotation amount of the first signal may meet the following relationship:

$$\text{diag}\{1, e^{-j2\pi m/MN}, \ldots, e^{-j2\pi m(K-1)/MN}\}.$$

K is the quantity of rows in the matrix of the extended Fourier transform, and N is the quantity of columns in the matrix of the extended Fourier transform.

In a possible design solution, the first signal may include a plurality of pilot blocks, phases of the plurality of pilot blocks are obtained through phase rotation, and phases of any two of the plurality of pilot blocks after rotation are different.

Optionally, the plurality of pilot blocks may be P pilot blocks, and a phase rotation amount of a $p^{th}$ pilot block in the P pilot blocks may meet the following relationship:

$$e^{-j\pi\mu p(p+1)/P}, 0 \le p \le P-1, \text{ and } 1 \le \mu \le P-1.$$

Optionally, the transceiver module may alternatively include a sending module and a receiving module. The sending module is configured to implement a sending function of the apparatus according to the third aspect, and the receiving module is configured to implement a receiving function of the apparatus according to the third aspect.

Optionally, the apparatus according to the third aspect may further include a storage module, and the storage module stores a program or instructions. When the processing module executes the program or the instructions, the apparatus is enabled to perform the method according to the first aspect.

It should be noted that, the apparatus according to the third aspect may be a terminal or a network device, may be a chip (system) or another part or component that can be disposed in a terminal or a network device, or may be an apparatus including a terminal or a network device. This is not limited in the disclosure.

In addition, for technical effects of the apparatus according to the third aspect, refer to the technical effects of the method according to the first aspect. Details are not described herein again.

According to a fourth aspect, an embodiment of the disclosure provides a communication apparatus. The apparatus includes a processing module and a transceiver module. The transceiver module is configured to receive a first signal, and the processing module is configured to demodulate the first signal. The first signal is a signal obtained by performing deceleration modulation on a symbol, and a time interval between two symbols that undergo deceleration modulation is greater than a time interval between the two symbols that do not undergo deceleration modulation.

In a possible design solution, the first signal may be a signal obtained by performing deceleration modulation on the symbol based on a pulse shaping filter.

Optionally, the first signal, the pulse shaping filter, and the symbol may meet the following relationship:

$$s(t) = \sum_{n=-CP}^{N-1} a_{n\,modN}\, g(t-\alpha nT).$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, and T is a time interval between two adjacent symbols.

In a possible design solution, the first signal may be a signal obtained by performing deceleration and spectrum shifting modulation on the symbol based on the pulse shaping filter.

Optionally, the first signal, the pulse shaping filter, and the symbol may meet the following relationship:

$$s(t) = \sum_{n=-CP}^{N-1} a_{n\,modN}\, g(t-\alpha nT)\cos \pi(t-\alpha nT)/T_g.$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, T is a time interval between two adjacent symbols, ½$T_g$ is a spectrum shifting amount, and $T_g$ is pulse duration of the pulse shaping filter.

In a possible design solution, the first signal may be a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

Optionally, the first signal, the matrix of the extended Fourier transform, and the symbol may meet the following relationship:

$$s(t) = \sum_{k=-\frac{K}{2}}^{\frac{K}{2}-1} \sum_{n=0}^{N-1} a_n e^{-j2\pi kf(n)} e^{j2\pi k\Delta ft}; \text{ and}$$

$$-T_{cp} \le t < T_{sym}.$$

s(t) is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, Δf is a subcarrier spacing, $T_{cp}$ is duration corresponding to a cyclic prefix in the first signal, and $T_{sym}$ is duration corresponding to an original signal in the first signal.

Optionally, the first signal may be a signal obtained by performing deceleration modulation and phase rotation modulation on the symbol based on the matrix of the extended Fourier transform, and phase rotation amounts of different signals are different.

Optionally, the first signal may be an $m^{th}$ signal in M signals, and a phase rotation amount of the first signal may meet the following relationship:

$$\text{diag}\{1, e^{-j2\pi m/MN}, \ldots, e^{-j2\pi m(K-1)/MN}\}.$$

K is the quantity of rows in the matrix of the extended Fourier transform, and N is the quantity of columns in the matrix of the extended Fourier transform.

In a possible design solution, the first signal may include a plurality of pilot blocks, phases of the plurality of pilot blocks are obtained through phase rotation, and phases of any two of the plurality of pilot blocks after rotation are different.

Optionally, the plurality of pilot blocks may be P pilot blocks, and a phase rotation amount of a $p^{th}$ pilot block in the P pilot blocks may meet the following relationship:

$$e^{-j\pi\mu p(p+1)/P}, 0 \le p \le P-1, \text{ and } 1 \le \mu \le P-1.$$

Optionally, the transceiver module may alternatively include a sending module and a receiving module. The sending module is configured to implement a sending function of the apparatus according to the fourth aspect, and the receiving module is configured to implement a receiving function of the apparatus according to the fourth aspect.

Optionally, the apparatus according to the fourth aspect may further include a storage module, and the storage module stores a program or instructions. When the processing module executes the program or the instructions, the apparatus is enabled to perform the method according to the second aspect.

It should be noted that, the apparatus according to the fourth aspect may be a terminal or a network device, may be a chip (system) or another part or component that can be disposed in a terminal or a network device, or may be an apparatus including a terminal or a network device. This is not limited in the disclosure.

In addition, for technical effects of the apparatus according to the fourth aspect, refer to the technical effects of the method according to the second aspect. Details are not described herein again.

According to a fifth aspect, a communication apparatus is provided. The apparatus includes a processor. The processor is configured to perform the method according to the first aspect or the second aspect.

In a possible design solution, the apparatus according to the fifth aspect may further include a transceiver. The transceiver may be a transceiver circuit or an interface circuit. The transceiver may be used by the apparatus to communicate with another apparatus.

In a possible design solution, the apparatus according to the fifth aspect may further include a memory. The memory and the processor may be integrated together, or may be disposed separately. The memory may be configured to store a computer program and/or data related to the method according to the first aspect or the second aspect.

In the disclosure, the apparatus according to the fifth aspect may be a terminal or a network device in the first aspect or the second aspect, for example, the first device or the second device, or a chip (system) or another part or component that can be disposed in the terminal or the network device, or an apparatus including the terminal or the network device.

In addition, for technical effects of the apparatus according to the fifth aspect, refer to the technical effects of the method according to the first aspect or the second aspect. Details are not described herein again.

According to a sixth aspect, a communication apparatus is provided. The apparatus includes a processor and a memory. The memory is configured to store computer instructions. When the processor executes the instructions, the apparatus is enabled to perform the method according to the first aspect or the second aspect.

In a possible design solution, the apparatus according to the sixth aspect may further include a transceiver. The transceiver may be a transceiver circuit or an interface circuit. The transceiver may be used by the apparatus to communicate with another apparatus.

In the disclosure, the apparatus according to the sixth aspect may be a terminal or a network device in the first aspect or the second aspect, for example, the first device or the second device, or a chip (system) or another part or component that can be disposed in the terminal or the network device, or an apparatus including the terminal or the network device.

In addition, for technical effects of the apparatus according to the sixth aspect, refer to the technical effects of the method according to the first aspect or the second aspect. Details are not described herein again.

According to a seventh aspect, a communication apparatus is provided. The apparatus includes a logic circuit and an input/output interface. The input/output interface is configured to receive code instructions and transmit the code instructions to the logic circuit. The logic circuit is configured to run the code instructions to perform the method according to the first aspect or the second aspect.

In the disclosure, the apparatus according to the seventh aspect may be a terminal or a network device in the first aspect or the second aspect, for example, the first device or the second device, or a chip (system) or another part or component that can be disposed in the terminal or the network device, or an apparatus including the terminal or the network device.

In addition, for technical effects of the apparatus according to the seventh aspect, refer to the technical effects of the method according to the first aspect or the second aspect. Details are not described herein again.

According to an eighth aspect, a communication apparatus is provided. The apparatus includes a processor and a transceiver. The transceiver is configured to exchange information between the communication apparatus and another apparatus. The processor executes program instructions to perform the method according to the first aspect or the second aspect.

In a possible design solution, the apparatus according to the eighth aspect may further include a memory. The memory and the processor may be integrated together, or may be disposed separately. The memory may be configured to store a computer program and/or data related to the method according to the first aspect or the second aspect.

In the disclosure, the apparatus according to the eighth aspect may be a terminal or a network device in the first aspect or the second aspect, for example, the first device or the second device, or a chip (system) or another part or component that can be disposed in the terminal or the network device, or an apparatus including the terminal or the network device.

In addition, for technical effects of the apparatus according to the eighth aspect, refer to the technical effects of the method according to the first aspect or the second aspect. Details are not described herein again.

According to a ninth aspect, a communication system is provided. The communication system includes one or more first devices and one or more second devices. The first device is configured to perform the method according to the first aspect, and the second device is configured to perform the method according to the second aspect.

According to a tenth aspect, a computer-readable storage medium is provided, including a computer program or instructions. When the computer program or the instructions are run on a computer, the computer is enabled to perform the method according to the first aspect or the second aspect.

According to an eleventh aspect, a computer program product is provided, including a computer program or instructions. When the computer program or the instructions are run on a computer, the computer is enabled to perform the method according to the first aspect or the second aspect.

DESCRIPTION OF EMBODIMENTS

The following describes technical terms in embodiments of the disclosure.

1. Waveform

The waveform may indicate distribution of a signal in terms of time or frequency. With the development of the 3rd generation partnership project (3GPP), the waveform also changes accordingly. A waveform modulated by using a Gaussian filtered minimum shift keying (GMSK) technology is used in a global system for mobile communications (GSM). A waveform modulated by a square root raised cosine filter with a roll-off factor of 0.22 is used in a universal mobile telecommunications system (UMTS). In a long term evolution (LTE) system, an orthogonal frequency-division multiplexing (OFDM) waveform is used for downlink transmission, and a single-carrier frequency-division multiple access (SC-FDMA) waveform with a low peak-to-average power ratio (PAPR) is used for uplink transmission. In a new radio (NR) system, an OFDM waveform is used for downlink transmission, and an OFDM or SC-FDMA waveform may be used for uplink transmission. Currently, waveforms are developing towards higher frequency bands. For example, the Institute of Electrical and Electronics Engineers (IEEE) 802.15.4a formulates an ultra-wideband communication protocol based on impulse radio for ultra-wideband communication, and IEEE 802.15.3d formulates a communication protocol based on single-carrier modulation and on-off keying for a sub-terahertz frequency band.

2. Nyquist Signaling

Figure 1:
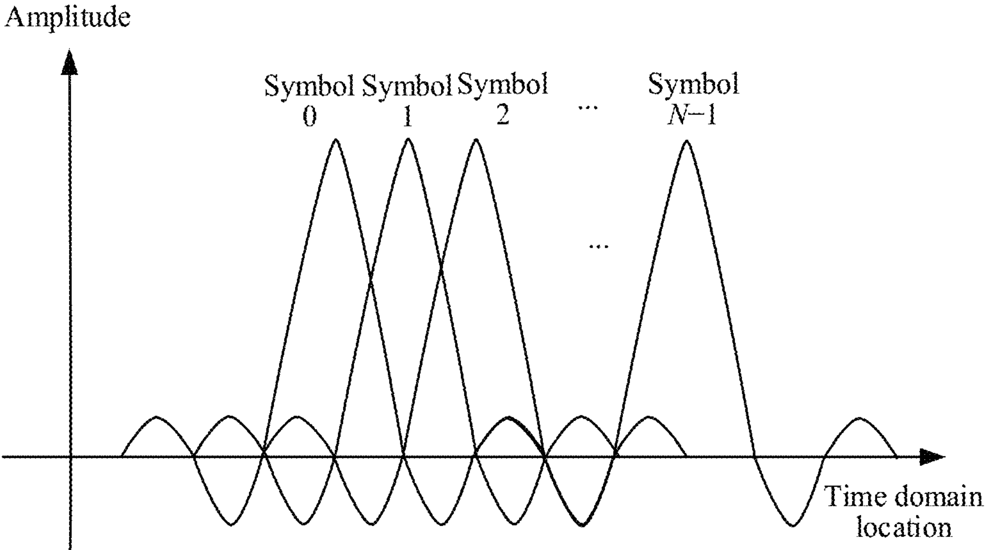
FIG. 1 is a schematic diagram of a waveform of Nyquist signaling.

FIG. 1 is a schematic diagram of a waveform of Nyquist signaling. For an ideal low pass channel, there is no intersymbol interference between adjacent symbols. For example, an amplitude location of a symbol 1 in FIG. 1 is a zero-crossing point location between a symbol 0 and a symbol 2. In this case, a Nyquist signaling rate is an ultimate transmission rate of intersymbol interference-free transmission. For example, for digital baseband transmission, the Nyquist signaling rate is equal to twice a bandwidth of a baseband signal; and for digital band-pass transmission, the Nyquist signaling rate is equal to a bandwidth of a band-pass signal.

3. FTN

Figure 2:
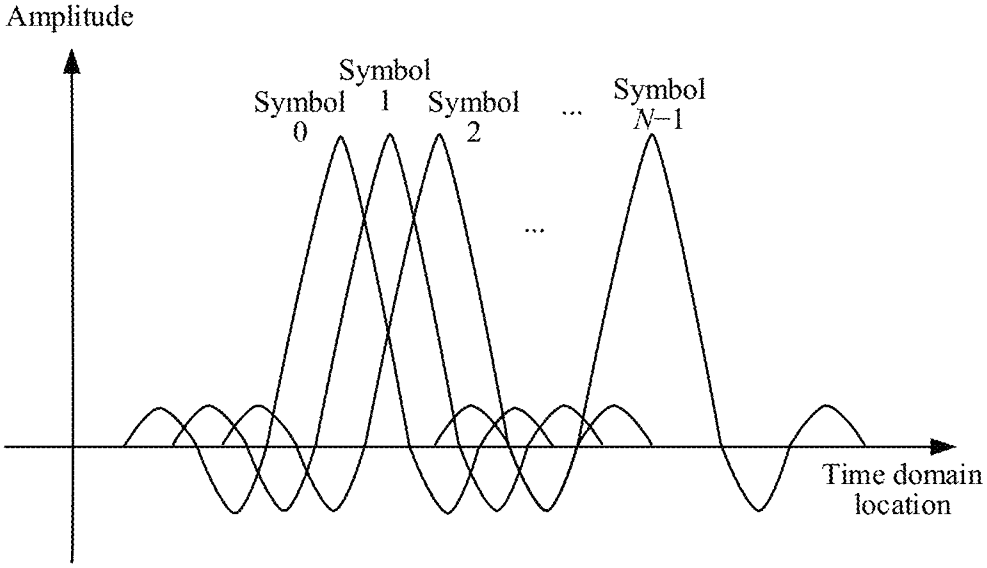
FIG. 2 is a schematic diagram of a waveform of faster-than-Nyquist signaling.

FIG. 2 is a schematic diagram of a waveform of FTN. For a single carrier, based on Nyquist signaling, a time-domain pulse interval may be compressed to increase symbol density, so that a transmission rate and spectral efficiency are improved, thereby implementing FTN. When a single-carrier FTN signal is modulated through binary phase-shift keying (BPSK), if a ratio of a compressed time-domain pulse interval to an original time-domain pulse interval (an uncompressed time-domain pulse interval) is greater than or equal to 0.802, there is no loss in a bit error rate of the FTN signal. A multi-carrier may be modulated through spectrally efficient frequency-division multiplexing (SEFDM) to ensure that a subcarrier width remains unchanged and a subcarrier spacing is compressed, thereby implementing multi-carrier FTN. However, intersymbol interference is introduced into FTN, and consequently, it is relatively difficult to demodulate an FTN signal.

4. Channel Capacity

A Shannon channel capacity formula may be shown in Formula 1, and a free space path loss may be shown in Formula 2.

$$C = B \times \log_2\left(1 + \frac{P_r}{n_0 B}\right) \tag{1}$$

$$\frac{P_r}{P_t} = \left(\frac{c}{4\pi d f_c}\right)^2 \tag{2}$$

C is the channel capacity, B is a channel bandwidth, $n_0$ is a noise power spectral density, $P_r$ is receive power, $P_t$ is transmit power, c is a speed of light, d is a propagation distance, and $f_c$ is a carrier frequency. If the receive power and the noise power spectral density are determinate, according to Formula 1 and Formula 2, a relationship between C and B may be further represented as Formula 3.

$$C = \begin{cases} B \times \log_2\left(\frac{P_r}{n_0 B}\right) & B \to 0 \\ \frac{P_r}{n_0 \ln 2} & B \to \infty \end{cases} \quad (3)$$

It can be learned from Formula 3 that, when the receive power and the noise power spectral density are fixed, for narrowband transmission (B→0), the channel capacity is in directly proportional to a bandwidth; and when the receive power is fixed, for broadband transmission (B→∞), the channel capacity has no correlation with the bandwidth and is directly proportional to the receive power. Using an LTE or NR frequency band and an ultra-high frequency band such as a sub-terahertz frequency band or a terahertz frequency band as examples, a relationship between a channel capacity and a bandwidth may be shown in Table 1.

TABLE 1

| | frequency band | | | | | |
|---|---|---|---|---|---|---|
| | LTE or NR | | | Terahertz | | |
| | parameter | | | | | |
| | carrier frequency is 3.5 GHz (gigahertz) receive power is 23 dBm (decibel-milliwatt) noise power spectral density is −102 dBm/MHz | | | carrier frequency is 3000 GHz receive power is 23 dBm noise power spectral density is −72 dBm/GHz | | |
| bandwidth | 10 MHz | 100 MHz | Infinite | 1 GHz | 10 GHz | Infinite |
| channel capacity | 59 Mbit/s (megabit/second) | 280 Mbit/s | 857 Mbit/s | 266 Mbit/s | 289 Mbit/s | 292 Mbit/s |
| gain | none | 375% | 1353% | None | 8.65% | 9.77% |

It can be learned that, when the receive power and the noise power spectral density are fixed, as the bandwidth increases, an increase multiple of the channel capacity of the LTE or NR frequency band is greater than an increase multiple of the channel capacity of the terahertz frequency band. In other words, for the LTE or NR frequency band, the bandwidth is a bottleneck of the channel capacity; and for the terahertz frequency band, the receive power is a bottleneck of the channel capacity. In an ultra-high frequency band, due to limited receive power, using FTN signaling or Nyquist signaling cannot improve spectral efficiency, and on the contrary, has a high requirement on processing speeds of a DAC device and an ADC device. As a result, a hardware threshold is very high, and it is impossible to consider all types of hardware. In addition, to resist multipath interference, a cyclic prefix of a signal in the ultra-high frequency band is very long. Consequently, FTN signaling or Nyquist signaling cannot improve spectral efficiency, and on the contrary, reduces spectral efficiency.

In conclusion, for the foregoing technical problem, embodiments of the disclosure provide the following technical solutions, to improve spectral efficiency of an ultra-high frequency band.

The technical solutions in embodiments of the disclosure may be applied to various communication systems, for example, a wireless fidelity (Wi-Fi) system, a vehicle-to-everything (V2X) communication system, a device-to-device (D2D) communication system, an Internet of Vehicles communication system, a 4th generation (4G) mobile communication system such as an LTE system, a 5th generation (5G) mobile communication system such as an NR system, and a future communication system such as a sixth generation (6G) communication system. Certainly, the future communication system may also be named in another manner, and the naming manner is still covered in the scope of the disclosure. This is not limited in the disclosure.

All aspects, embodiments, or features are presented in the disclosure by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of the disclosure, words such as "example" and "for example" are used to represent giving an example, an illustration, or a description. Any embodiment or design solution described as an "example" in the disclosure should not be explained as being more preferred or having more advantages than another embodiment or design solution. Exactly, use of the word "example" is intended to present a concept in a specific manner.

In embodiments of the disclosure, terms "information", "signal", "message", "channel", and "signaling" may be interchangeably used sometimes. It should be noted that meanings expressed by the terms are consistent when differences of the terms are not emphasized. Terms "of", "corresponding (corresponding, relevant)", and corresponding may be interchangeably used sometimes. It should be noted that meanings expressed by the terms are consistent when differences of the terms are not emphasized. In addition, "/" mentioned in the disclosure may be used to represent an "or" relationship.

The network architecture and the service scenario described in embodiments of the disclosure are intended to describe the technical solutions in embodiments of the disclosure more clearly, and do not constitute a limitation on the technical solutions provided in embodiments of the disclosure. A person of ordinary skill in the art may know that, with evolution of the network architecture and emergence of new service scenarios, the technical solutions provided in embodiments of the disclosure are also applicable to similar technical problems.

Figure 3:
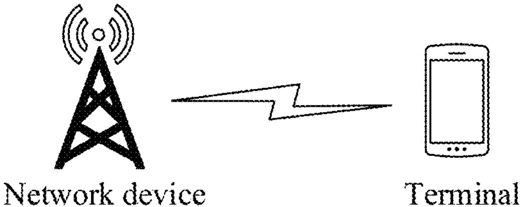
FIG. 3 is a schematic diagram of an architecture of a communication system according to an embodiment of the disclosure.

To facilitate understanding of embodiments of the disclosure, a communication system shown in FIG. 3 is first used as an example to describe in detail a communication system applicable to embodiments of the disclosure. For example, FIG. 3 is a schematic diagram of an architecture of a communication system to which a communication method according to embodiments of the disclosure is applicable.

As shown in FIG. 3, the communication system includes a terminal and a network device.

The terminal is a terminal that accesses a network and that has a wireless receiving/sending function, or a chip or a chip system that can be disposed in the terminal. The terminal may also be referred to as user equipment (UE), an access terminal, a subscriber unit, a subscriber station, a mobile station (MS), a remote station, a remote terminal, a mobile device, a user terminal, a terminal, a wireless communication device, a user agent, or a user apparatus. The terminal in the embodiment of the disclosure may be a mobile phone, a cellular phone, a smartphone, a tablet computer (Pad), a wireless data card, a personal digital assistant (PDA), a wireless modem (modem), a handset, a laptop computer, a machine type communication (MTC) terminal, a computer with a wireless receiving/sending function, a virtual reality (VR) terminal, an augmented reality (AR) terminal, a wireless terminal in industrial control, a wireless terminal in self driving, a wireless terminal in telemedicine or telehealth services, a wireless terminal in a smart grid, a wireless terminal in transportation safety, a wireless terminal in a smart city, a wireless terminal in a smart home, an in-vehicle terminal, an RSU with a terminal function, or the like. The terminal in the disclosure may alternatively be an in-vehicle module, an in-vehicle assembly, an in-vehicle part, an in-vehicle chip, or an in-vehicle unit that is built in a vehicle as one or more parts or units.

The network device, for example, an access network device, is a device that is located on a network side of the communication system and that has a wireless receiving/sending function, or a chip or a chip system that can be disposed in the device. The network device may include an access network device in a next-generation mobile communication system such as 6G, for example, a gNB in 6G or a core network element in 6G. Alternatively, in the next-generation mobile communication system, the network device may be named in other manners, which all fall within the protection scope of embodiments of the disclosure. This is not limited in the disclosure. In addition, the network device may alternatively include a gNB in 5G such as an NR system, or one antenna panel or a group of antenna panels (including a plurality of antenna panels) of a gNB in 5G; or may be a network node that forms a gNB, a transmission point (TP), or a transmission reception point (TRP) or a transmission measurement function (TMF), for example, a baseband unit (BBU), a CU, a DU, a road side unit (RSU) with a base station function, or a wired access gateway. In addition, the network device may alternatively include an access point (AP), a wireless relay node, or a wireless backhaul node in a wireless fidelity (Wi-Fi) system, various forms of macro base stations, micro base stations (also referred to as small cells), relay stations, access points, wearable devices, in-vehicle devices, or the like.

The foregoing describes the communication system to which the communication method provided in embodiments of the disclosure is applicable. The following specifically describes, with reference to FIG. 4 to FIG. 13, the communication method provided in embodiments of the disclosure.

Figure 4:
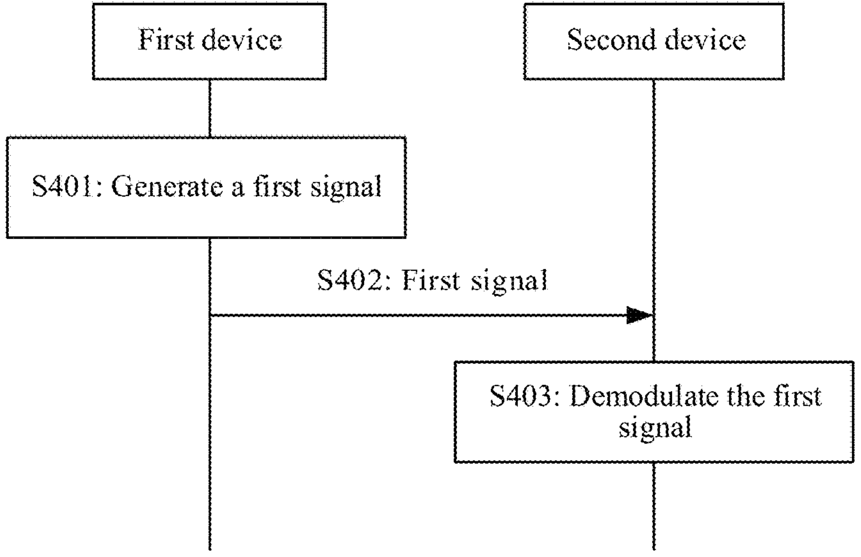
FIG. 4 is a schematic flowchart of a communication method according to an embodiment of the disclosure.

For example, FIG. 4 is a first schematic flowchart of a communication method according to an embodiment of the disclosure. The communication method is applicable to communication between a first device and a second device. The first device may be the terminal or the network device in the communication system shown in FIG. 3, and the second device may be the terminal or the network device in the communication system shown in FIG. 3. As shown in FIG. 4, the communication method includes S401, S402, and S403.

S401: The first device generates a first signal.

The first signal is a signal obtained by performing deceleration modulation on a symbol. The first signal may be a single-carrier signal or a multi-carrier signal. There may be a plurality of symbols (for ease of description, the plurality of symbols are referred to as a first symbol sequence below). Each symbol may be a modulation symbol corresponding to any one of the following modulation manners: π/2-BPSK, on-off keying (OOK), amplitude-shift keying (ASK), quaternary phase-shift keying (QPSK), quadrature amplitude modulation (QAM), or the like, which is not limited; or may be a modulation symbol corresponding to any other possible modulation scheme. The deceleration modulation described above means increasing a time interval between symbols in a signal in a modulation process, that is, a time interval between two symbols that undergo deceleration modulation is greater than a time interval between the two symbols that do not undergo deceleration modulation, so that a transmission rate of the signal can be reduced. For example, if a signal transmission rate before deceleration modulation is a Nyquist signaling rate, a signal transmission rate after deceleration modulation is less than the Nyquist signaling rate, and may also be referred to as a transmission rate of slower-than-Nyquist signaling (STN). For another example, if a signal transmission rate before deceleration modulation is an FTN transmission rate, a signal transmission rate after deceleration modulation is a Nyquist signaling rate or a slower-than-Nyquist signaling rate. For still another example, if a signal transmission rate before deceleration modulation is a slower-than-Nyquist signaling rate (denoted as an initial transmission rate of slower-than-Nyquist signaling), a signal transmission rate after deceleration modulation may be less than the initial transmission rate. The following specifically describes deceleration modulation by using an example in which the first signal is a single-carrier signal or the first signal is a multi-carrier signal.

Case A: The first signal is a single-carrier signal.

The first signal may be a single-carrier signal obtained by performing deceleration modulation on a symbol based on single-carrier quadrature amplitude modulation (SC-QAM). SC-QAM may be implemented based on a pulse shaping filter, that is, the first signal is also a signal obtained by performing deceleration modulation on the symbol based on the pulse shaping filter. In this case, the first signal, the pulse shaping filter, and the symbol may meet a relationship shown in Formula 4:

$$s(t) = \sum_{n=-CP}^{N1} a_{n\,modN}\, g(t - \alpha nT) \tag{4}$$

In Formula 4, s(t) is the first signal, g(t) is an impulse response function of the pulse shaping filter, $a_n$ is an $n^{th}$ symbol, n is an integer ranging from −CP to N−1, CP may be an integer, and CP is an index of a cyclic prefix. For specific implementation of the cyclic prefix, refer to the following procedure description of SC-QAM. Details are not described herein. $a_{n\ mod\ N}$ means that $a_n$ takes the modulus of N. α may be defined as a deceleration factor (or any other possible name), and has a value greater than 1. The first device may flexibly adjust a symbol transmission rate of deceleration modulation by adjusting a value of α. For example, if $\alpha$ is set to 2, deceleration modulation is represented by increasing a symbol time interval by two times; and if $\alpha$ is set to 3, deceleration modulation is represented by increasing the symbol time interval by three times, and so on. In addition, t is a time variable, and T is a time interval between two adjacent symbols (referred to as a time interval for short below). There is a specific relationship between the time interval and a bandwidth. For different types of pulse shaping filters, relationships between the time interval and the bandwidth are also different, which are described in detail below.

Manner 11: The pulse shaping filter is an ideal low-pass filter.

The ideal low-pass filter may meet a Nyquist signaling rate, that is, a product of a time interval and a bandwidth of the ideal low-pass filter is ½. An impulse response function of the ideal low-pass filter may be shown in Formula 5.

$$g(t) = \frac{\sin \pi t/T}{\pi t/T} \tag{5}$$

It can be learned from Formula 5 that a waveform of the impulse response function of the ideal low-pass filter in time domain is a square wave. The bandwidth of the ideal low-pass filter and a frequency response of the ideal low-pass filter may meet a relationship shown in Formula 6.

$$G(f) = \begin{cases} 1, & |f| \le 1/2T \\ 0, & |f| > 1/2T \end{cases} \tag{6}$$

In Formula 6, f is a frequency of the ideal low-pass filter, $-B \le f \le B$, and B is the bandwidth of the ideal low-pass filter.

Manner 12: The pulse shaping filter is a square root raised cosine filter.

The square root raised cosine filter usually cannot meet a Nyquist signaling rate, but can meet a slower-than-Nyquist signaling rate. For example, a transmission rate of the square root raised cosine filter is $1/(1+\beta)$ of the Nyquist signaling rate, that is, a product of a time interval and a bandwidth of the square root raised cosine filter is $(1+\beta)/2$, where $\beta$ is a roll-off factor, and $0 \le \beta \le 1$. An impulse response function of the square root raised cosine filter may be shown in Formula 7.

$$g(t) = \frac{\sin\frac{\pi t(1-\beta)}{T} + \frac{4\beta t}{T}\cos\frac{\pi t(1+\beta)}{T}}{\frac{\pi t}{T}\left[1 - \left(\frac{4\beta t}{T}\right)^2\right]} \tag{7}$$

It can be learned from Formula 7 that the bandwidth of the square root raised cosine filter and a frequency response of the square root raised cosine filter may meet a relationship shown in Formula 8.

$$G(f) = \begin{cases} 1, & |f| \le \frac{1-\beta}{2T} \\ \cos\frac{\pi T}{2\beta}\left(|f| - \frac{1-\beta}{2T}\right), & \frac{1-\beta}{2T} < |f| < \frac{1+\beta}{2T} \\ 0, & |f| \ge \frac{1+\beta}{2T} \end{cases} \tag{8}$$

In Formula 8, f is a frequency of the square root raised cosine filter, $-B \le f \le B$, and B is the bandwidth of the square root raised cosine filter.

Manner 13: The pulse shaping filter is a bandwidth-limited filter.

The bandwidth-limited filter means that a bandwidth of the filter is a determinate value. The bandwidth-limited filter usually cannot meet a Nyquist signaling rate, but can meet a slower-than-Nyquist signaling rate, that is, a product of a time interval and the bandwidth of the bandwidth-limited filter is greater than ½. A correlation expression of the bandwidth-limited filter may be shown in Formula 9.

$$\int_{-\infty}^{+\infty} g(t - mT)g(t - nT)dt \begin{cases} = 1, & m = n \\ \le \varepsilon, & m \ne n \end{cases} \tag{9}$$

In Formula 9, g(t) is an impulse response function of the bandwidth-limited filter, for example, a Gaussian function, and $\varepsilon$ is maximum intersymbol interference allowed by a system. It can be learned from Formula 9 that, for any two symbols modulated by the bandwidth-limited filter, a time interval between the two symbols can make intersymbol interference between the two symbols less than or equal to the maximum intersymbol interference allowed by the system, thereby avoiding affecting communication reliability due to an excessively high bit error rate.

Figure 5:
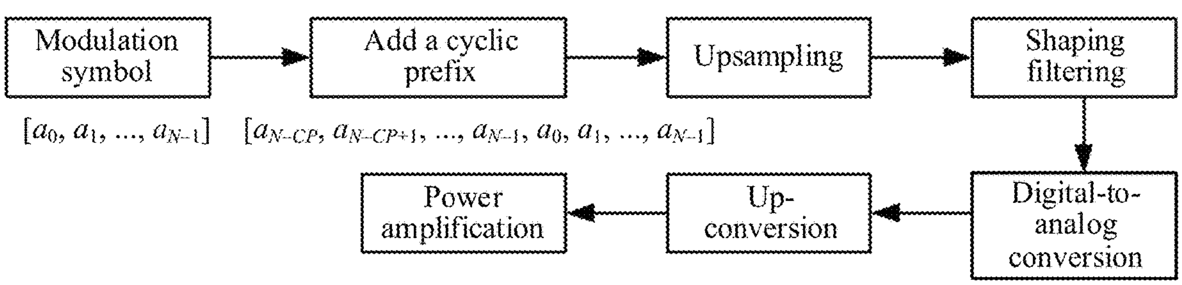
FIG. 5 is a schematic flowchart of a single-carrier signal in a communication method according to an embodiment of the disclosure.
Figure 6:
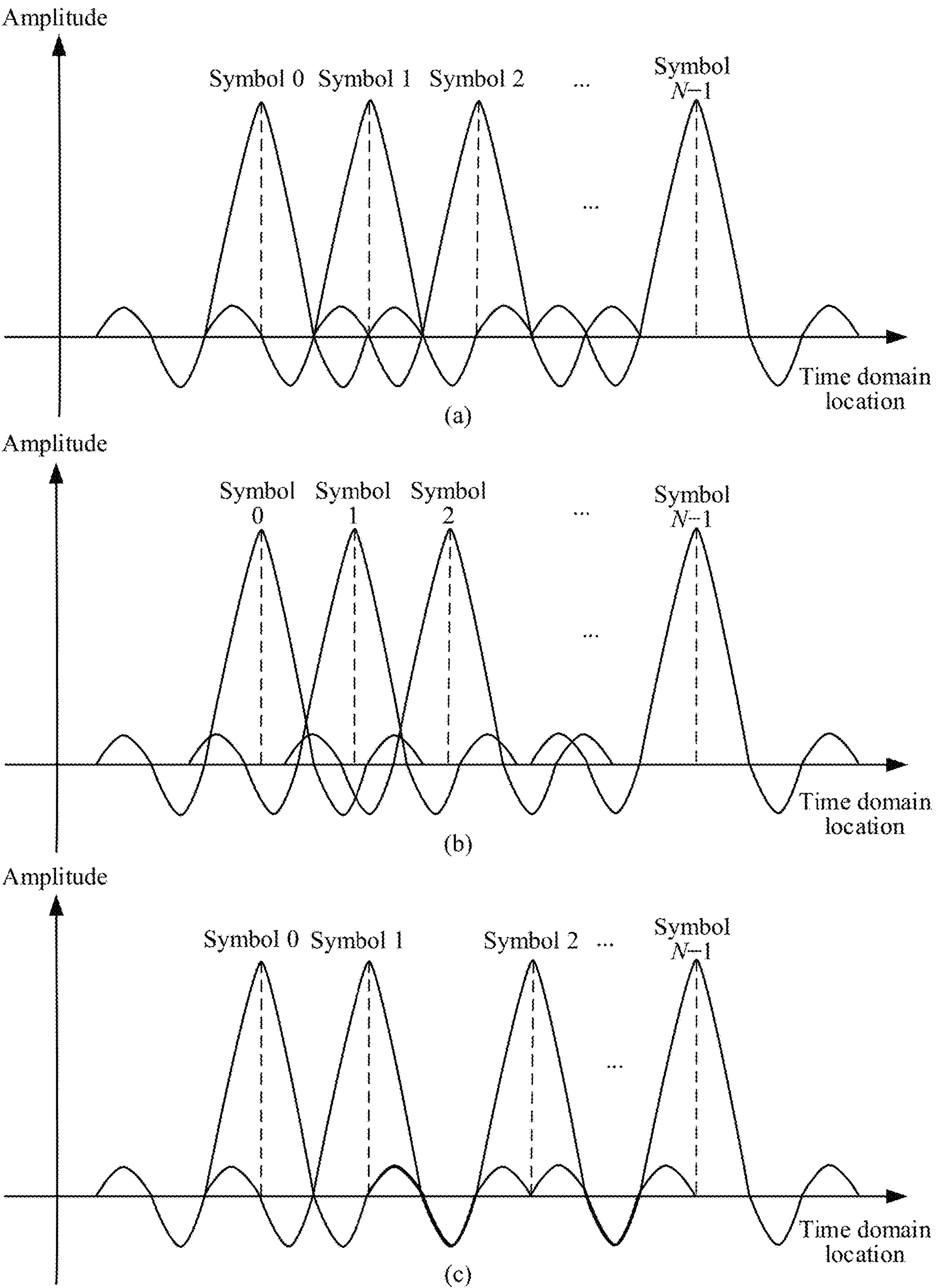
FIG. 6 is a schematic diagram of a waveform of a multi-carrier signal in a communication method according to an embodiment of the disclosure.

Further, FIG. 5 is a schematic flowchart of SC-QAM. The first device may add a cyclic prefix to the first symbol sequence to obtain a second symbol sequence (the second symbol sequence includes the first symbol sequence and the cyclic prefix). The cyclic prefix may be at least some symbols in the first symbol sequence. For example, there are N symbols in the first symbol sequence, which are represented as $[a_0, a_1, \ldots, a_{N-1}]$, where N is an integer greater than 1. The cyclic prefix may be represented as $[a_{N-CP}, a_{N-CP+1}, \ldots, a_{N-1}]$. In this way, the second symbol sequence may be represented as $[a_{N-CP}, a_{N-CP+1}, \ldots, a_{N-1}, a_0, a_1, \ldots, a_{N-1}]$. The first device may perform upsampling processing on the second symbol sequence to obtain a third symbol sequence that is more consecutive in time domain. Upsampling processing may be performing interpolation on the second symbol sequence, for example, inserting "0" between adjacent symbols. Therefore, upsampling processing is also referred to as interpolation processing. For example, the second symbol sequence is represented as $[a_{N-CP}, a_{N-CP+1}, \ldots, a_{N-1}, a_0, a_1, \ldots, a_{N-1}]$. In this case, the third symbol sequence obtained through upsampling processing may be represented as $[a_{N-CP}, 0, a_{N-CP+1}, 0, \ldots, a_{N-1}, 0, a_0, 0, a_1, 0, \ldots, a_{N-1}]$. The first device may perform shaping filtering on the third symbol sequence based on the pulse shaping filter, to increase a time interval between adjacent symbols in the third symbol sequence, so as to obtain the first signal shown in Formula 4.

Case B: The first signal is a multi-carrier signal.

The first signal may be a multi-carrier signal obtained by performing deceleration modulation on a symbol based on multi-carrier orthogonal frequency-division multiplexing (OFDM) or single-carrier frequency-division multiple access (SC-FDMA). Using SC-FDMA as an example, SC-FDMA may be implemented based on extended Fourier transform, that is, the first signal is also a signal obtained by performing deceleration modulation on the symbol based on the extended Fourier transform. In this case, the first signal, a matrix of the extended Fourier transform, and the symbol may meet relationships shown in Formula 10 and Formula 11:

$$s(t) = \sum_{k=-\frac{K}{2}}^{\frac{K}{2}-1} \sum_{n=0}^{N-1} a_n e^{-j2\pi kf(n)} e^{j2\pi k\Delta ft} \quad (10)$$

$$-T_{cp} \le t < T_{sym} \quad (11)$$

In Formula 10 and Formula 11, s(t) is the first signal, K is a quantity of rows (that is, a quantity of subcarriers) in the matrix of the extended Fourier transform, N is a quantity of columns in the matrix of the extended Fourier transform, $a_n$ is an $n^{th}$ symbol, $e^{-2\pi kf(n)}$ is an element in the matrix of the extended Fourier transform, Δf is a subcarrier spacing, f(n) is a variable (for a specific implementation principle, refer to the following related description), $T_{cp}$ is duration corresponding to a cyclic prefix in the first signal, and $T_{sym}$ is duration corresponding to an original signal in the first signal. For a multi-carrier signal, a ratio of K to N may be considered as a deceleration factor of the multi-carrier signal, and the first device may flexibly adjust a symbol transmission rate of deceleration modulation by adjusting a value of the deceleration factor. For example, if the ratio of K to N is set to 2, deceleration modulation is represented by increasing a symbol time interval by two times; and if the ratio of K to N is set to 3, deceleration modulation is represented by increasing the symbol time interval by three times, and so on.

In a possible manner, if the deceleration factor is an integer, f(n)=n/N in Formula 10, the element in the matrix of the extended Fourier transform may be further represented as $[e^{-j2\pi kf(n)}]_{0\le k\le K-1, 0\le n\le N-1}$. In this case, the first signal may be considered as a signal obtained by replicating, in frequency domain, the integer multiple of a sequence obtained by performing N-dimensional discrete Fourier transform (DFT) on the symbol. Every two symbols in the first signal are equally spaced, and no intersymbol interference exists. For example, as shown in (a) in FIG. 6, a symbol 0, a symbol 1, and a symbol 2 are equally spaced, and no intersymbol interference exists.

In another possible manner, the deceleration factor is a non-integer, f(n)=n/N in Formula 10, and the element in the matrix of the extended Fourier transform may be further represented as $[e^{-j2\pi kf(n)}]_{0\le k\le K-1, 0\le n\le N-1}$. The first signal may be considered as a signal obtained by evenly mapping symbols to corresponding subcarriers. In this case, symbols in the first signal are equally spaced, but intersymbol interference may exist. As shown in (b) in FIG. 6, a symbol 0, a symbol 1, and a symbol 2 are equally spaced, but intersymbol interference exists.

In still another possible manner, the deceleration factor is a non-integer, f(n)=[nK/N]'/K in formula 10, where [ ]' is rounding (which is, for example, rounding up or rounding down, and is not limited in the disclosure), and the element in the matrix of the extended Fourier transform may be further represented as $[e^{-j2\pi k[nK/N]'/K}]_{0\le k\le K-1, 0\le n\le N-1}$. In this case, the first signal may be considered as a signal obtained by unevenly mapping symbols to corresponding subcarriers. In this case, symbols in the first signal are not equally spaced, but no intersymbol interference exists. As shown in (c) in FIG. 6, a symbol 0, a symbol 1, and a symbol 2 are not equally spaced, but no intersymbol interference exists.

Figure 7:
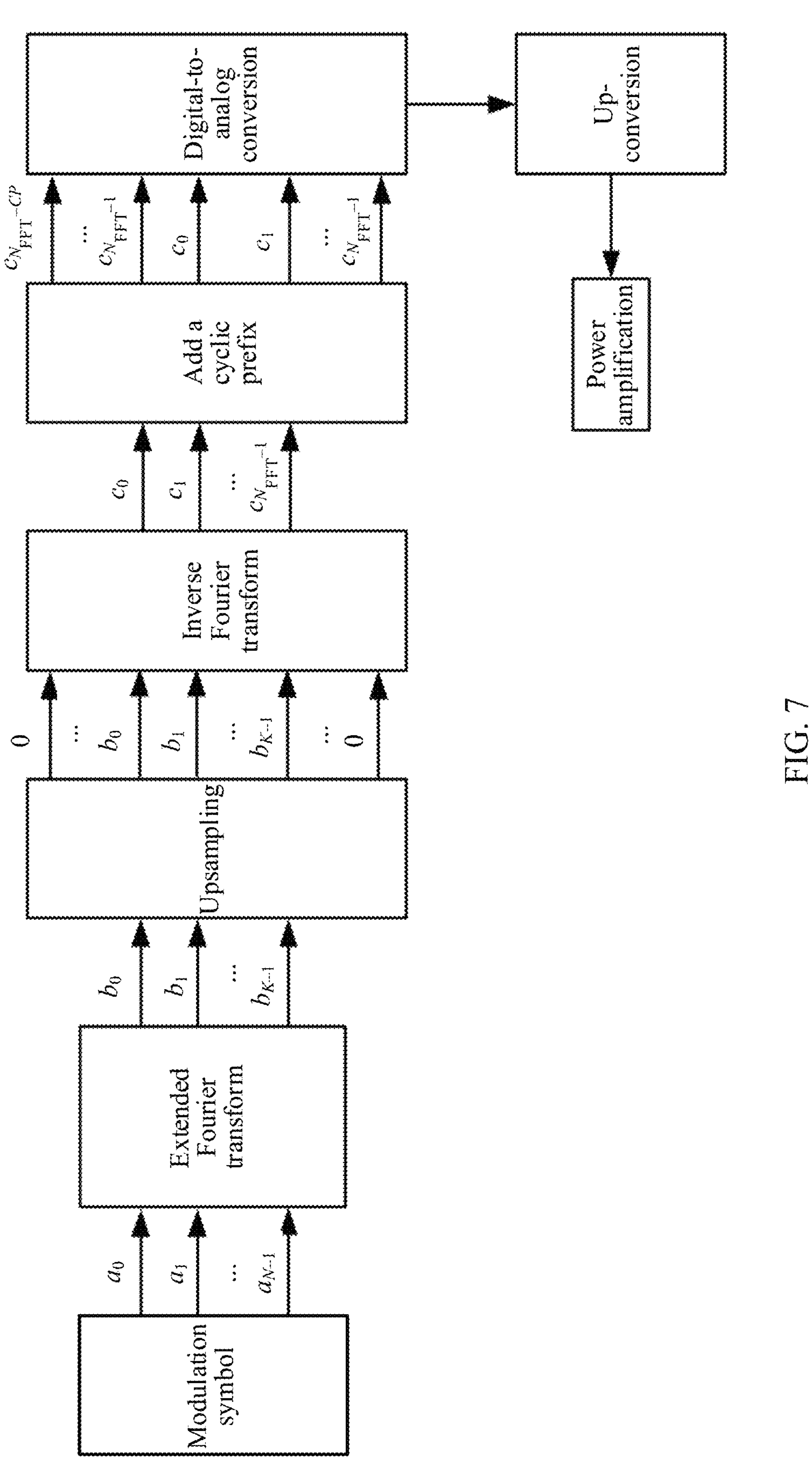
FIG. 7 is a first schematic flowchart of a multi-carrier signal in a communication method according to an embodiment of the disclosure.

FIG. 7 is a schematic flowchart of SC-FDMA. The first device may perform extended Fourier transform on the first symbol sequence to obtain a fourth symbol sequence in frequency domain. For example, there are N symbols in the first symbol sequence, which are represented as $[a_0, a_1, \ldots, a_{N-1}]$, where N is an integer greater than 1. The fourth symbol sequence may include K symbols, which are represented as $[b_0, b_1, \ldots, b_{K-1}]$. The first device may perform upsampling on the fourth symbol sequence to obtain a fifth symbol sequence. Upsampling processing may be performing interpolation on the fourth symbol sequence, for example, respectively inserting $$\frac{N_{FFT}-K}{2} \text{“0”}$$

on two sides of the fourth symbol sequence. Therefore, upsampling processing is also referred to as interpolation processing. $N_{FFT}$ may be a quantity of points in fast Fourier transform, and usually has a value of an integer power of 2. For example, the fourth symbol sequence is represented as $[b_0, b_1, \ldots, b_{K-1}]$. In this case, the fifth symbol sequence obtained through upsampling processing may be represented as $[0, \ldots, 0, b_0, b_1, \ldots, b_{K-1}, 0, \ldots, 0]$. The first device may perform inverse Fourier transform (IDFT) on the fifth symbol sequence to obtain a sixth symbol sequence, which may be represented as $[c_0, c_1, \ldots, c_{N_{FFT}-1}]$. The first device may add a cyclic prefix to the sixth symbol sequence to obtain the first signal shown in Formula 10. The cyclic prefix may be at least some symbols in the sixth symbol sequence. For example, the sixth symbol sequence is represented as $[c_0, c_1, \ldots, c_{N_{FFT}-1}]$. In this case, the cyclic prefix may be represented as $[c_{N_{FFT}-N_{CP}}, c_{N_{FFT}-N_{CP}+1}, \ldots, c_{N_{FFT}-1}]$. In this way, the first signal may be represented in a sequence form, for example, represented as $[c_{N_{FFT}-N_{CP}}, c_{N_{FFT}-N_{CP}+1}, \ldots, c_{N_{FFT}-1}, c_0, c_1, c_{N_{FFT}-1}]$.

S402: The first device sends the first signal. Correspondingly, the second device receives the first signal.

After obtaining the first signal by using the procedure shown in FIG. 5 or FIG. 7, the first device may sequentially perform digital-to-analog conversion, up-conversion, and power amplification on the first signal, and then send the first signal.

S403: The second device demodulates the first signal.

Figure 8:
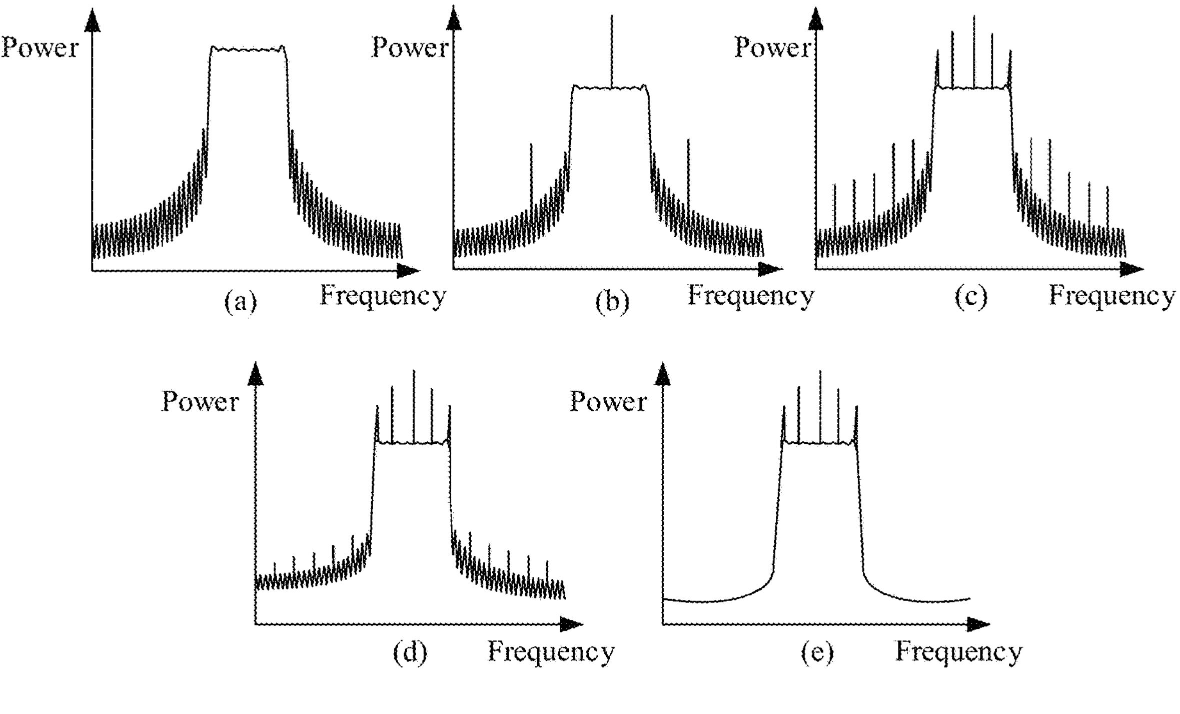
FIG. 8 is a schematic diagram of a waveform of a carrier signal in a communication method according to an embodiment of the disclosure.

The second device demodulates the first signal to obtain the symbol. FIG. 8 is a schematic flowchart of demodulation. The second device may perform band-pass filtering, down-conversion, and analog-to-digital conversion on the first signal to obtain the first signal that is a digital signal. The second device may continue to perform matched filtering and downsampling on the first signal to obtain a symbol sequence that includes a cyclic prefix. The second device removes the cyclic prefix from the symbol sequence, and then performs equalization processing, for example, minimum mean square error equalization (optionally, maximal ratio combining processing may be further included) to obtain the symbol. It should be noted that, the second device may perform downsampling by using a slower-than-Nyquist signaling rate, or may perform downsampling by using a Nyquist signaling rate. This is not limited in the disclosure.

In conclusion, based on the method shown in FIG. 4, it can be learned that, in an ultra-high frequency band, because power of a device is limited, increasing a time interval between symbols through deceleration modulation does not reduce spectral efficiency. On the contrary, increasing the time interval between the symbols not only can reduce a signal-to-noise ratio, but also can effectively shorten a length of a cyclic prefix of a signal, thereby improving spectral efficiency of the ultra-high frequency band.

Optionally, with reference to the foregoing embodiment, in a possible design solution, the first signal may alternatively be a signal obtained by performing deceleration and spectrum shifting modulation on the symbol based on the pulse shaping filter.

Specifically, deceleration modulation (for example, unipolar deceleration modulation) usually causes the first signal to have an impulse function (which is reflected as a peak characteristic on a spectrum). For example, the symbol is a modulation symbol corresponding to OOK or unipolar ASK, an impulse response function of the pulse shaping filter is g(t), and Fourier transform corresponding to the impulse response function may be represented as G(f)=F{g(t)}. A power spectral density function of the first signal may be shown in Formula 12.

$$P_s(f) = f_s|G(f)|^2/4 + f_s^2|G(0)|^2\delta(f)/4 + f_s^2\sum_{a=1}^{+\infty} f_s^2|G(af_s)|^2\delta(f - af_s)/4 \quad (12)$$

In Formula 12, $P_s(f)$ is a power spectral density of the first signal; $f_s$ is an element transmission rate of the first signal, and $f_s=1/\alpha T$, that is, $f_s$ is negatively correlated with a symbol interval of the first signal; α is a constant, and may be 1 to a positive infinity; and δ(f) and $\delta(f-\alpha f_s)$ are impulse functions. It can be learned that a quantity of impulse functions is related to a value of $f_s$. For example, a smaller $f_s$ indicates a larger deceleration amplitude of the first signal and a larger quantity of impulse functions of the first signal. For example, as shown in (a) in FIG. 8, if a signal is modulated through π/2-BPSK and meets a Nyquist signaling rate, the signal has no impulse function, that is, a signal power spectral density shown in (a) in FIG. 8 has no peak. For example, as shown in (b) in FIG. 8, if a signal is modulated through OOK and meets a Nyquist signaling rate, the signal has a small quantity of impulse functions, that is, a signal power spectral density shown in (b) in FIG. 8 has a small quantity of peaks. For example, as shown in (c) in FIG. 8, if a signal is modulated through OOK and meets a slower-than-Nyquist signaling rate, for example, ¼ of a Nyquist signaling rate, the signal has a large quantity of impulse functions, that is, a signal power spectral density shown in (c) in FIG. 8 has a large quantity of peaks. It can be learned from Formula 12 that, if spectrum shifting is performed on the first signal, values of G(0) and $G(\alpha f_s)$ change accordingly, but a frequency domain location of the impulse function does not change, so that the impulse function can be coherently superposed with a spectral side lobe of the first signal, thereby effectively suppressing the peak characteristic of the spectrum, reducing an out-of-band leakage level of a signal, and improving signal quality.

In a possible implementation, the first signal, the pulse shaping filter, and the symbol may further meet a relationship shown in Formula 13:

$$s(t) = \sum_{n=-CP}^{N-1} a_{n \bmod N}\, g(t - \alpha nT)\cos \pi(t - \alpha nT)/T_g \quad (13)$$

In Formula 13, $T_g$ is pulse duration of the pulse shaping filter, and in the power spectral density function, a zero-crossing point interval of a side lobe of the first signal is a reciprocal of $T_g$; and $½T_g$ is a spectrum shifting amount, which may be further represented as Formula 14.

$$g(t - \alpha nT)\cos \pi(t - \alpha nT)/T_g = \frac{1}{2}g(t - \alpha nT)e^{j\pi(t-\alpha nT)/T_g} + \frac{1}{2}g(t - \alpha nT)e^{-j\pi(t-\alpha nT)/T_g} \quad (14)$$

Generally, $T_g$ may be far greater than T, that is, a spectrum shifting amount of the first signal is relatively small, and is close to the zero-crossing point interval of the side lobe of the first signal. To be specific, the first signal is shifted leftwards and rightwards by a half of the zero-crossing point interval, so that a side lobe of the first signal after spectrum shifting can be coherently superposed with the impulse function, to be suppressed or eliminated. It should be noted that, if a ratio of $T_g$ to $T_{sym}$ (duration corresponding to an original signal in the first signal) is an integer, the impulse function may be eliminated through spectrum shifting; or if the ratio of $T_g$ to $T_{sym}$ is a non-integer, the impulse function may be suppressed through spectrum shifting. For example, as shown in (d) in FIG. 8, a signal is modulated through OOK and meets a slower-than-Nyquist signaling rate. If the ratio of $T_g$ to $T_{sym}$ is a non-integer, after spectrum shifting is performed on the signal, an impulse function on a side lobe of the signal is suppressed, that is, a height of a peak on the side lobe is decreased. For another example, as shown in (e) in FIG. 8, a signal is modulated through OOK and meets a slower-than-Nyquist signaling rate. If the ratio of $T_g$ to $T_{sym}$ is an integer, after spectrum shifting is performed on the signal, an impulse function on a side lobe of the signal is eliminated, that is, there is no peak on the side lobe. In addition, because the spectrum shifting amount of the first signal is relatively small, a bandwidth increase of the first signal after spectrum shifting is very small, to ensure spectral efficiency.

It can be understood that the spectrum shifting amount described above is merely an example, and constitutes no limitation. For example, the first device may perform modulation by using a larger or smaller spectrum shifting amount. This is not limited in the embodiment of the disclosure.

Figure 9:
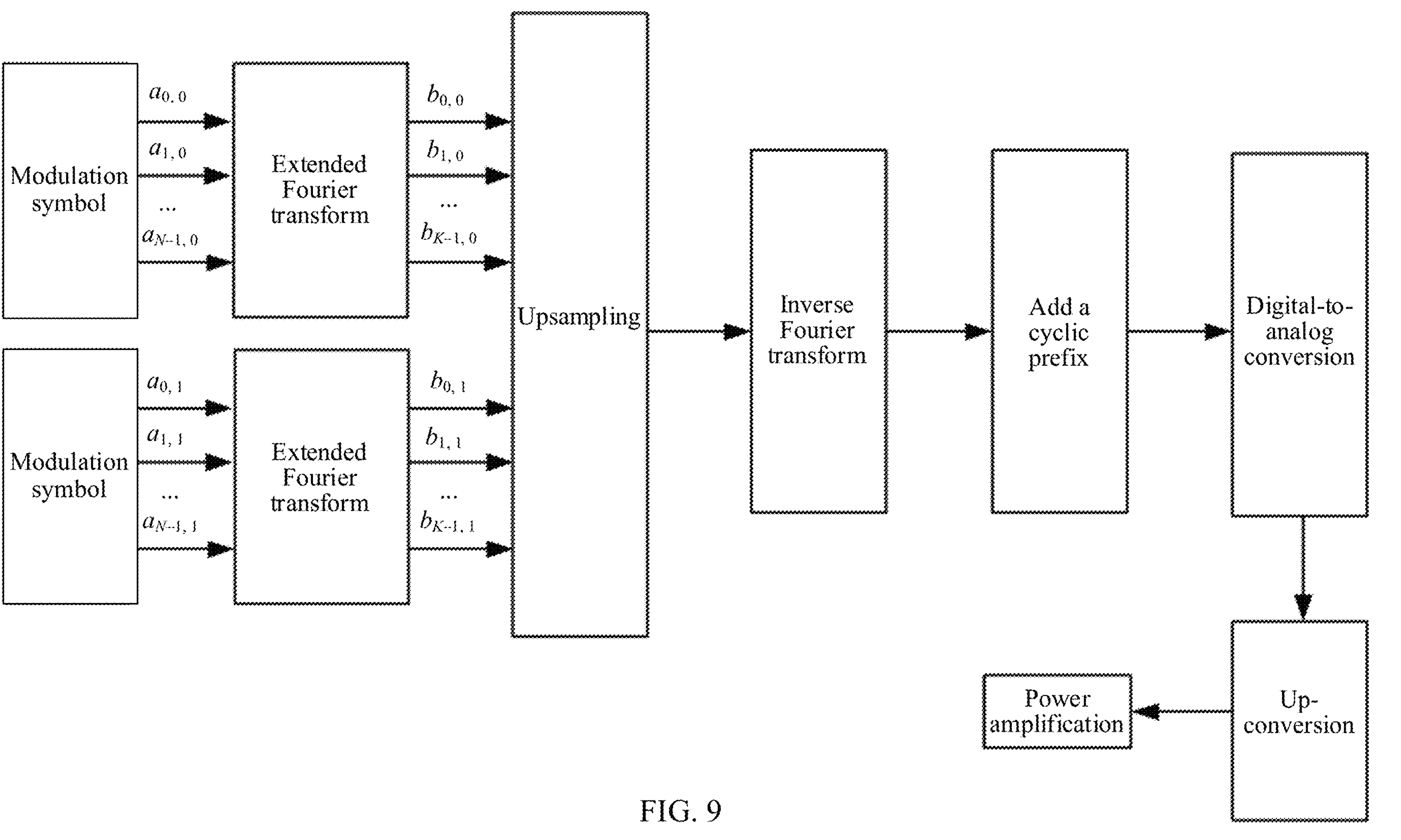
FIG. 9 is a second schematic flowchart of a multi-carrier signal in a communication method according to an embodiment of the disclosure.

Optionally, with reference to the foregoing embodiment, in a possible design solution, for a multi-carrier signal, different signals correspond to different subcarriers, to implement frequency division multiplexing of different signals, so that a multiple access manner is more flexible and communication efficiency is higher. As shown in FIG. 9, a first signal and a second signal are used as examples. The first device may perform extended Fourier transform on some symbols (denoted as a first symbol and represented as $[a_{0,0}, a_{1,0}, \ldots, a_{N-1,0}]$), map a transformed first symbol (represented as $[b_{0,0}, b_{1,0}, \ldots, b_{K-1,0}]$) to a first subcarrier, and perform upsampling and IDFT (for specific implementation, reference may be made to the foregoing related descriptions of the multi-carrier signal, and details are not described again), to obtain the first signal. The first device may perform the extended Fourier transform on some other symbols (denoted as a second symbol and represented as $[a_{0,1}, a_{1,1}, \ldots, a_{N-1,1}]$), map a transformed second symbol (represented as $[b_{0,1}, b_{1,1}, \ldots, b_{K-1,1}]$) to a second subcarrier, and perform upsampling and IDFT (for specific implementation, reference may be to the foregoing related descriptions of the multi-carrier signal, and details are not described again), to obtain the second signal. The first subcarrier is different from the second subcarrier.

Optionally, with reference to the foregoing embodiment, in a possible design solution, for a multi-carrier signal, phase rotation amounts of different signals are different, that is, time division multiplexing of different signals is implemented by using sparseness of slower-than-Nyquist signaling in time domain, so that a multiple access manner is more flexible and communication efficiency is higher. A first signal and a second signal are used as examples. The first signal may be a signal obtained by performing deceleration modulation and phase rotation (for example, a phase rotation amount is $\varphi_1$) modulation on some symbols (denoted as a first symbol) based on a matrix of extended Fourier transform, and the second signal may be a signal obtained by performing deceleration modulation and phase rotation (for example, a phase rotation amount is $\varphi_2$) modulation on some other symbols (denoted as a second symbol) based on the matrix of the extended Fourier transform, where $\varphi_1$ is different from $\varphi_2$. It should be noted that, when phase rotation amounts are different, the first signal and the second signal may be mapped to a same subcarrier.

Figure 10:
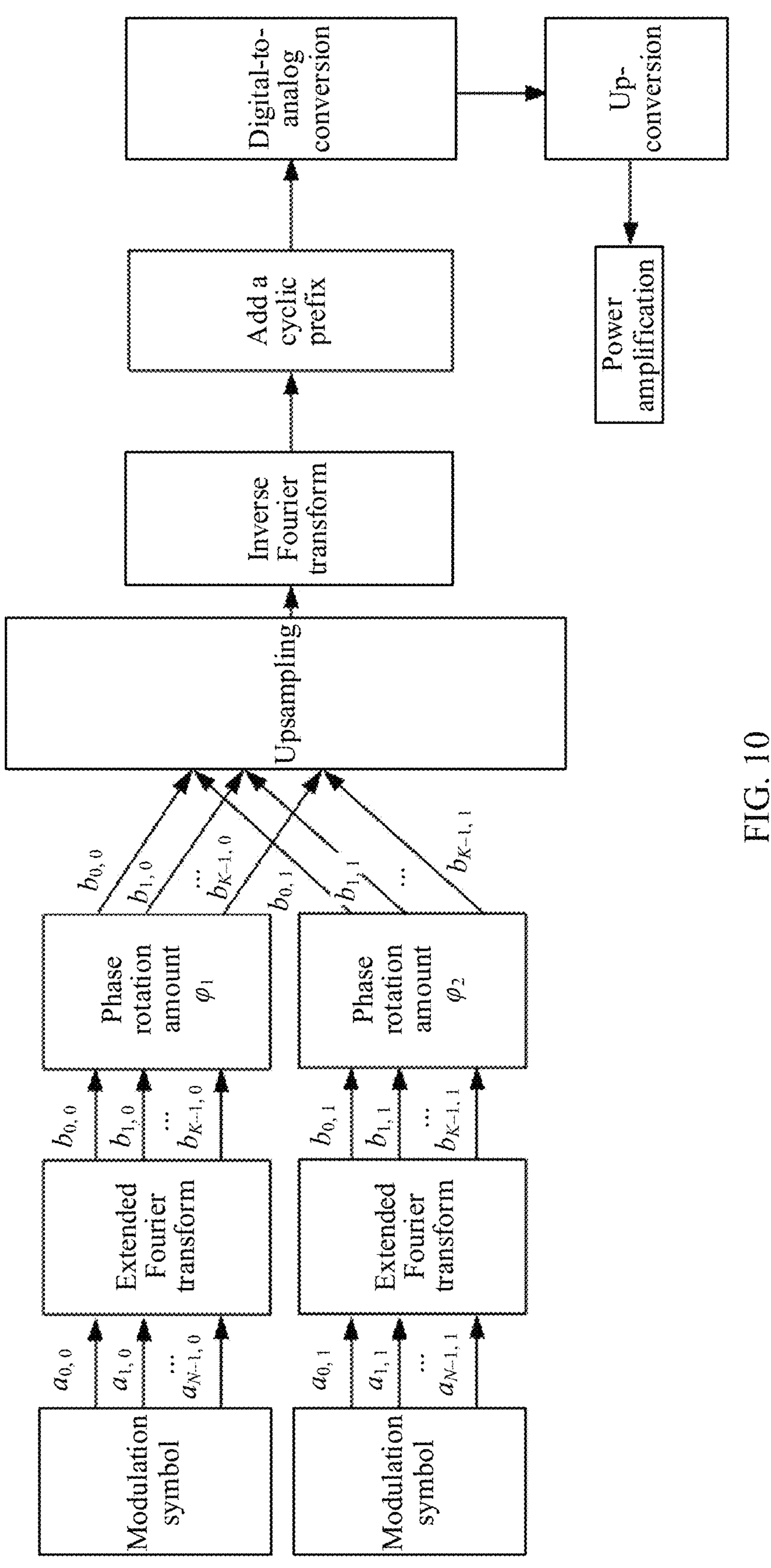
FIG. 10 is a third schematic flowchart of a multi-carrier signal in a communication method according to an embodiment of the disclosure.

For example, as shown in FIG. 10, the first device may perform the extended Fourier transform on the first symbol (represented as $[a_{0,0}, a_{1,0}, \ldots, a_{N-1,0}]$), and perform phase rotation on a transformed first symbol (represented as $[b_{0,0}, b_{1,0}, \ldots, b_{K-1,0}]$) based on $\varphi_1$, to obtain a rotated first symbol (represented as $[c_{0,0}, c_{1,0}, \ldots, c_{K-1,0}]$). The first device maps the rotated first symbol to a third subcarrier, and performs upsampling and IDFT (for specific implementation, reference may be made to the foregoing related descriptions of the multi-carrier signal, and details are not described again), to obtain the first signal. The first device may perform the extended Fourier transform on the second symbol (represented as $[a_{0,1}, a_{1,1}, \ldots, a_{N-1,1}]$), and perform phase rotation on a transformed second symbol (represented as $[b_{0,1}, b_{1,1}, \ldots, b_{K-1,1}]$) based on $\varphi_2$, to obtain a rotated second symbol (represented as $[c_{0,1}, c_{1,1}, \ldots, c_{K-1,1}]$). The first device maps the rotated second symbol to the third subcarrier, and performs upsampling and IDFT (for specific implementation, reference may be made to the foregoing related descriptions of the multi-carrier signal, and details are not described again), to obtain the second signal.

In a possible implementation, the first signal is used as an example. The first signal may be an $m^{th}$ signal in M signals, and a phase rotation amount of the first signal may meet a relationship shown in Formula 15:

$$\mathrm{diag}\{1, e^{-j2\pi m/MN}, \ldots, e^{-j2\pi m(K-1)/MN}\} \tag{14}$$

In Formula 15, K is the quantity of rows in the matrix of the extended Fourier transform, and N is the quantity of columns in the matrix of the extended Fourier transform. In this way, it may be ensured that phase rotation amounts of different signals are different, a distance between different signals is relatively large, and intersymbol interference between different signals is relatively small. Therefore, signal quality can be improved. Certainly, Formula 15 is merely an example of determining a phase rotation amount, and constitutes no limitation. The first device may alternatively determine the phase rotation amount of the first signal in any other possible manner, for example, randomly determining the phase rotation amount of the first signal.

Optionally, with reference to the foregoing embodiment, in a possible design solution, the first signal may include a plurality of pilot blocks (also referred to as a reference signal block, for example, a demodulation reference signal (DMRS) block), phases of the plurality of pilot blocks are obtained through phase rotation, and phases of any two of the plurality of pilot blocks after rotation are different. In this way, multipath interference between pilot blocks can be reduced, and accuracy of channel estimation can be improved.

In a possible implementation, the plurality of pilot blocks may be P pilot blocks, and a phase rotation amount of a $p^{th}$ pilot block in the P pilot blocks may meet a relationship shown in Formula 16.

$$e^{-j\pi\mu p(p+1)/P},\ 0 \le p \le P-1, \text{ and } 1 \le \mu \le P-1 \tag{16}$$

Figure 11:
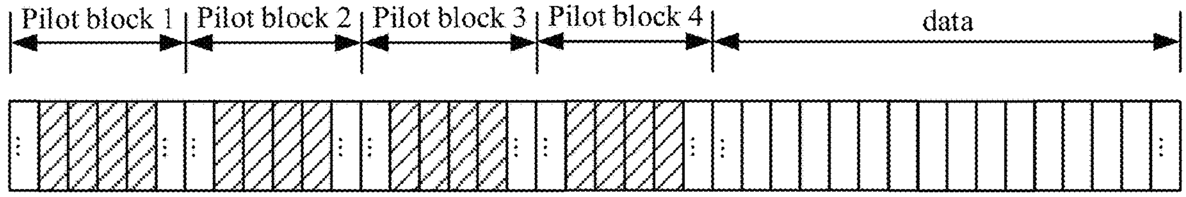
FIG. 11 is a first schematic diagram of a frame structure of a signal in a communication method according to an embodiment of the disclosure.

It can be learned from Formula 16 that, phases of the P pilot blocks after rotation are relatively randomly distributed on a complex number plane. In this way, multipath interference between the P pilot blocks may also be relatively randomly distributed on a unit circle to suppress each other, to reduce multipath interference between pilot blocks. Further, when μ and P are relatively prime, the phases of the P pilot blocks after rotation may be relatively evenly distributed on the unit circle of the complex number plane. For example, as shown in FIG. 11, there are a total of four pilot blocks, a phase rotation amount of a pilot block 1 is $e^{-j\pi\mu 0\times 1/4}$, a phase rotation amount of a pilot block 2 is $e^{-j\pi\mu 1\times 2/4}$, a phase rotation amount of a pilot block 3 is $e^{-j\pi\mu 2\times 3/4}$, and a phase rotation amount of a pilot block 4 is $e^{-j\pi\mu 3\times 4/4}$. In this way, multipath interference between the P pilot blocks may also be relatively evenly distributed on the unit circle to be superposed and canceled, to further reduce multipath interference between pilot blocks. It can be understood that, Formula 16 is merely an example of determining a phase rotation amount of a pilot block, and constitutes no limitation. The first device may alternatively determine the phase rotation amount of the pilot block in any other possible manner, for example, randomly determining the phase rotation amount of the pilot block.

For ease of understanding, the following uses some examples for description.

Figure 12:
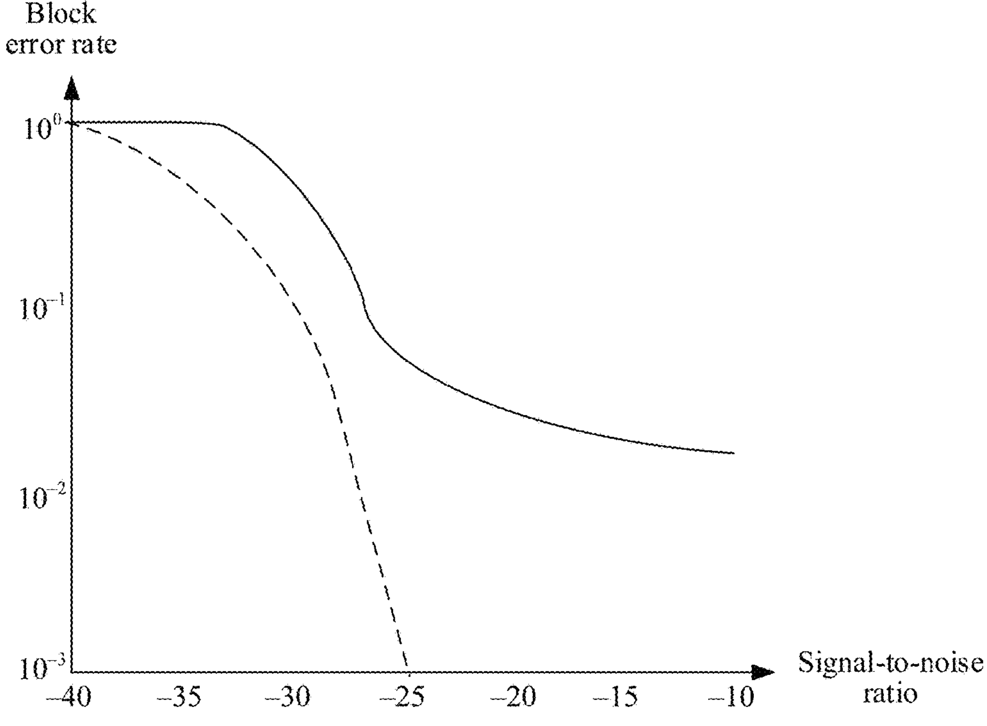
FIG. 12 is a first schematic diagram of simulation of a communication method according to an embodiment of the disclosure.
Figure 13:
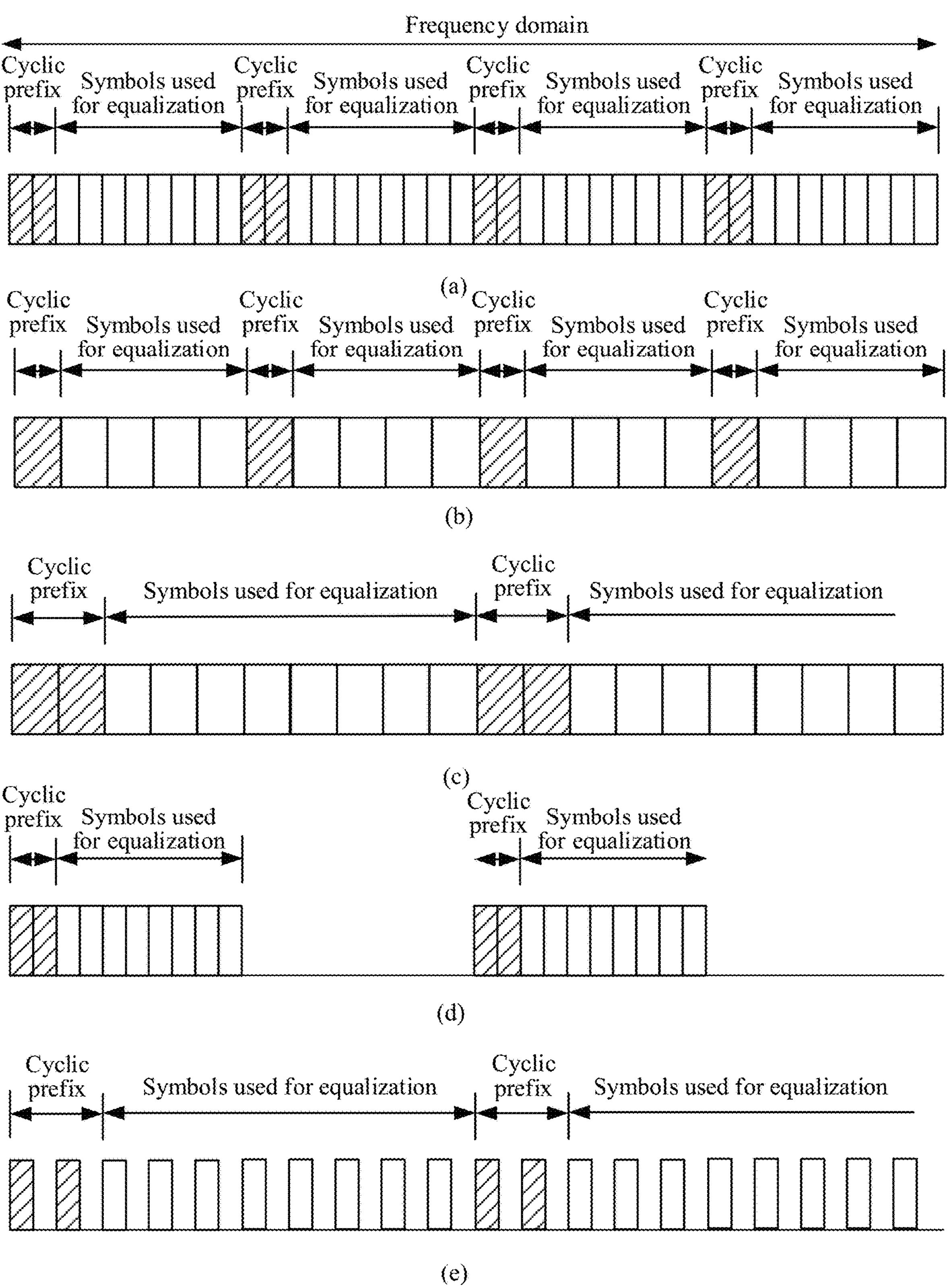
FIG. 13 is a second schematic diagram of a frame structure of a signal in a communication method according to an embodiment of the disclosure.

Example 1: FIG. 12 shows signal features of a signal 1 (a signal that undergoes ¼ times of deceleration modulation, as shown by a dashed line) and a signal 2 (a signal that does not undergo 1/deceleration modulation, as shown by a solid line) in a non-line-of-sight (NLOS) channel in an ultra-high frequency band. It can be learned that, if it is ensured that the signal 1 and the signal 2 have a same block error rate, the signal 1 has a smaller signal-to-noise ratio, better transmission performance, and higher spectral efficiency; and if it is ensured that the signal 1 and the signal 2 have a same signal-to-noise ratio, the signal 1 has a smaller block error rate, better transmission performance, and higher spectral efficiency.

Figure 14:
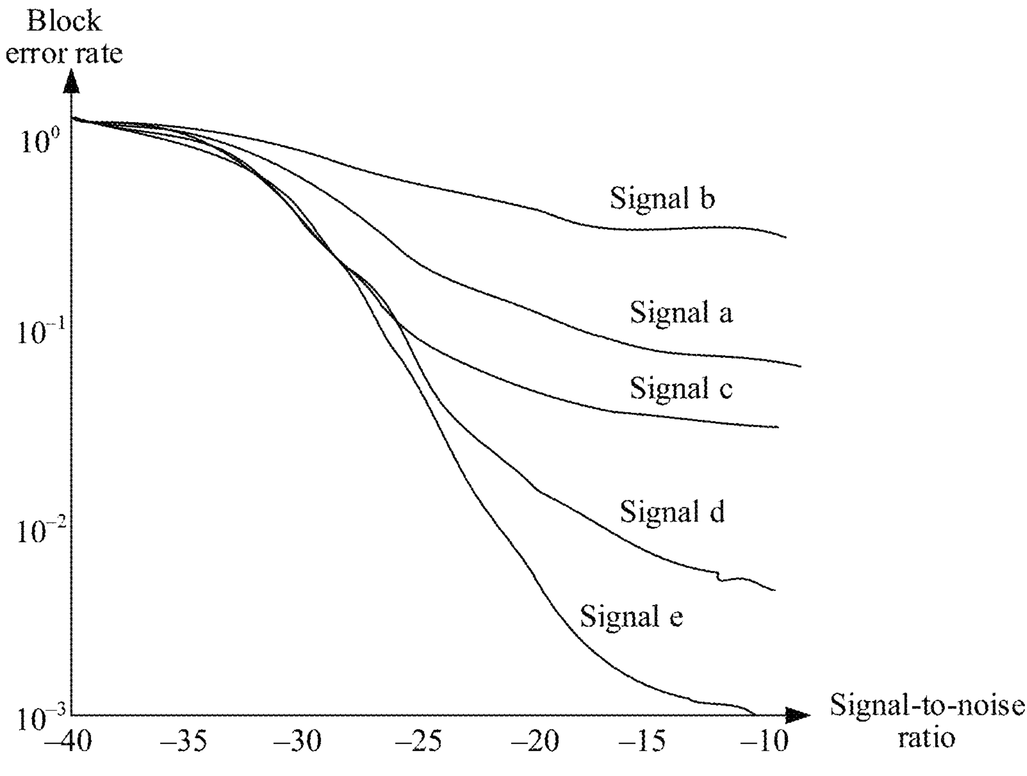
FIG. 14 is a second schematic diagram of simulation of a communication method according to an embodiment of the disclosure.

Example 2: A signal pattern of a signal a is shown in (a) in FIG. 13, where the signal a is a broadband signal and uses Nyquist signaling, and every eight symbols are used for equalization. A signal pattern of a signal b is shown in (b) in FIG. 13, where the signal b is a narrowband signal and uses Nyquist signaling, and every four symbols are used for equalization. A signal pattern of a signal c is shown in (c) in FIG. 13, where the signal c is a narrowband signal and uses Nyquist signaling, and every eight symbols are used for equalization. A signal pattern of a signal d is shown in (d) in FIG. 13, where the signal d is a broadband signal and uses burst transmission, and every eight symbols are used for equalization. A signal pattern of a signal e is shown in (e) in FIG. 13, where the signal e is a broadband signal and uses slower-than-Nyquist signaling with deceleration modulation, and every eight symbols are used for equalization. In this case, signal features of the signal a to the signal e may be shown in FIG. 14. It can be learned from FIG. 14 that, in a case of a same bandwidth, that is, all signals are narrowband signals, if it is ensured that the signal a, the signal d, and the signal e have a same block error rate, the signal e has a smaller signal-to-noise ratio, better transmission performance, and higher spectral efficiency; and if it is ensured that the signal a, the signal d, and the signal e have a same signal-to-noise ratio, the signal e has a smaller block error rate, better transmission performance, and higher spectral efficiency. In a case of different bandwidths, that is, a broadband signal and a narrowband signal, if it is ensured that the signal b, the signal c, and the signal e have a same block error rate, the signal e also has a smaller signal-to-noise ratio, better transmission performance, and higher spectral efficiency; and if it is ensured that the signal b, the signal c, and the signal e have a same signal-to-noise ratio, the signal e also has a smaller block error rate, better transmission performance, and higher spectral efficiency.

The communication method provided in embodiments of the disclosure is described above in detail with reference to FIG. 4 to FIG. 14. Communication apparatuses configured to perform the communication method provided in embodiments of the disclosure are described below in detail with reference to FIG. 15 to FIG. 17.

Figure 15:
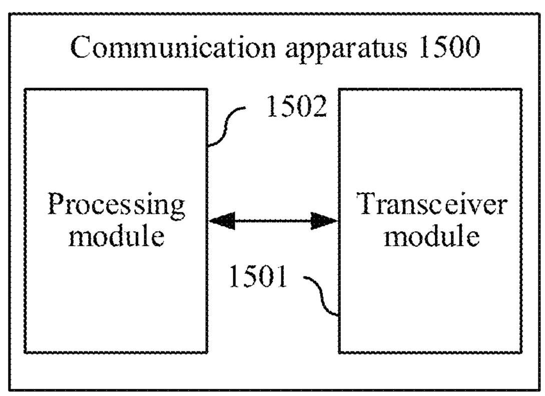
FIG. 15 is a first schematic diagram of a structure of a communication apparatus according to an embodiment of the disclosure.

For example, FIG. 15 is a first schematic diagram of a structure of a communication apparatus according to an embodiment of the disclosure. As shown in FIG. 15, the communication apparatus 1500 includes a transceiver module 1501 and a processing module 1502. For ease of description, FIG. 15 shows only main components of the communication apparatus.

In an embodiment, the communication apparatus 1500 may be used in the communication system shown in FIG. 3, and performs a function of the first device in the method shown in FIG. 4.

The processing module 1502 is configured to generate a first signal, and the transceiver module 1501 is configured to send the first signal. The first signal is a signal obtained by performing deceleration modulation on a symbol, and a time interval between two symbols that undergo deceleration modulation is greater than a time interval between the two symbols that do not undergo deceleration modulation.

In a possible design solution, the first signal may be a signal obtained by performing deceleration modulation on the symbol based on a pulse shaping filter.

Optionally, the first signal, the pulse shaping filter, and the symbol may meet the following relationship:

$$s(t)=\sum_{n=-CP}^{N-1} a_{n\,mod\,N}\, g(t-\alpha nT).$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, and T is a time interval between two adjacent symbols.

In a possible design solution, the first signal may be a signal obtained by performing deceleration and spectrum shifting modulation on the symbol based on the pulse shaping filter.

Optionally, the first signal, the pulse shaping filter, and the symbol may meet the following relationship:

$$s(t)=\sum_{n=-CP}^{N-1} a_{n\,mod\,N}\, g(t-\alpha nT)\cos \pi(t-\alpha nT)/T_g.$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of α is greater than 1, t is a time variable, T is a time interval between two adjacent symbols, and $T_g$ is pulse duration of the pulse shaping filter.

In a possible design solution, the first signal may be a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

Optionally, the first signal, the matrix of the extended Fourier transform, and the symbol may meet the following relationship:

$$s(t)=\sum_{k=-\frac{K}{2}}^{\frac{K}{2}-1}\sum_{n=0}^{N-1} a_n e^{-j2\pi kf(n)} e^{j2\pi k\Delta ft};\ \text{and}$$

$$-T_{cp}\le t<T_{sym}.$$

s(t) is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, Δf is a subcarrier spacing, $T_{cp}$ is duration corresponding to a cyclic prefix in the first signal, and $T_{sym}$ is duration corresponding to an original signal in the first signal.

Optionally, the first signal may be a signal obtained by performing deceleration modulation and phase rotation modulation on the symbol based on the matrix of the extended Fourier transform, and phase rotation amounts of different signals are different.

Optionally, the first signal may be an $m^{th}$ signal in M signals, and a phase rotation amount of the first signal may meet the following relationship:

$$\text{diag}\{1, e^{-2\pi m/MN}, \ldots, e^{-j2\pi m(K-1)/MN}\}.$$

K is the quantity of rows in the matrix of the extended Fourier transform, and N is the quantity of columns in the matrix of the extended Fourier transform.

In a possible design solution, the first signal may include a plurality of pilot blocks, phases of the plurality of pilot blocks are obtained through phase rotation, and phases of any two of the plurality of pilot blocks after rotation are different.

Optionally, the plurality of pilot blocks may be P pilot blocks, and a phase rotation amount of a $p^{th}$ pilot block in the P pilot blocks may meet the following relationship:

$$e^{-j\pi\mu p(p+1)/P}, 0 \le p \le P-1, \text{ and } 1 \le \mu \le P-1.$$

Optionally, the transceiver module 1501 may also include a sending module and a receiving module (not shown in FIG. 15). The sending module is configured to implement a sending function of the communication apparatus 1500, and the receiving module is configured to implement a receiving function of the communication apparatus 1500.

Optionally, the communication apparatus 1500 may further include a storage module (not shown in FIG. 15), and the storage module stores a program or instructions. When the processing module executes the program or the instructions, the communication apparatus 1500 is enabled to perform a function of the first device in the method shown in FIG. 4.

It should be understood that, the processing module in the communication apparatus 1500 may be implemented by a processor or a processor-related circuit component, and may be a processor or a processing unit; and the transceiver module may be implemented by a transceiver or a transceiver-related circuit component, and may be a transceiver or a transceiver unit.

It should be noted that, the communication apparatus 1500 may be a terminal or a network device, may be a chip (system) or another part or component that can be disposed in a terminal or a network device, or may be an apparatus including a terminal or a network device. This is not limited in the disclosure.

In addition, for technical effects of the communication apparatus 1500, refer to the corresponding technical effects in the method shown in FIG. 4. Details are not described herein again.

In another embodiment, the communication apparatus 1500 may be used in the communication system shown in FIG. 3, and performs a function of the second device in the method shown in FIG. 4.

The transceiver module 1501 is configured to receive a first signal, and the processing module 1502 is configured to demodulate the first signal. The first signal is a signal obtained by performing deceleration modulation on a symbol, and a time interval between two symbols that undergo deceleration modulation is greater than a time interval between the two symbols that do not undergo deceleration modulation.

In a possible design solution, the first signal may be a signal obtained by performing deceleration modulation on the symbol based on a pulse shaping filter.

Optionally, the first signal, the pulse shaping filter, and the symbol may meet the following relationship:

$$s(t) = \sum_{n=-CP}^{N-1} a_{n \bmod N}\, g(t - \alpha nT).$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of $\alpha$ is greater than 1, t is a time variable, and T is a time interval between two adjacent symbols.

In a possible design solution, the first signal may be a signal obtained by performing deceleration and spectrum shifting modulation on the symbol based on the pulse shaping filter.

Optionally, the first signal, the pulse shaping filter, and the symbol may meet the following relationship:

$$s(t) = \sum_{n=-CP}^{N-1} a_{n \bmod N}\, g(t - \alpha nT)\cos \pi(t - \alpha nT)/T_g.$$

s(t) is the first signal, g(t) is an impulse response function of the pulse shaping filter, $a_n$ is an $n^{th}$ symbol, n is an integer ranging from −CP to N−1, CP is an index of a cyclic prefix, CP may be an integer, a value of $\alpha$ is greater than 1, t is a time variable, T is a time interval between two adjacent symbols, and $T_g$ is pulse duration of the pulse shaping filter.

In a possible design solution, the first signal may be a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

Optionally, the first signal, the matrix of the extended Fourier transform, and the symbol may meet the following relationship:

$$s(t) = \sum_{k=-\frac{K}{2}}^{\frac{K}{2}-1} \sum_{n=0}^{N-1} a_n e^{-j2\pi kf(n)} e^{j2\pi k\Delta ft}; \text{ and}$$

$$-T_{cp} \le t < T_{sym}.$$

s(t) is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, $\Delta f$ is a subcarrier spacing, $T_{cp}$ is duration corresponding to a cyclic prefix in the first signal, and $T_{sym}$ is duration corresponding to an original signal in the first signal.

Optionally, the first signal may be a signal obtained by performing deceleration modulation and phase rotation modulation on the symbol based on the matrix of the extended Fourier transform, and phase rotation amounts of different signals are different.

Optionally, the first signal may be an $m^{th}$ signal in M signals, and a phase rotation amount of the first signal may meet the following relationship:

$$\text{diag}\{1, e^{-j2\pi m/MN}, \ldots, e^{-j2\pi m(K-1)/MN}\}.$$

K is the quantity of rows in the matrix of the extended Fourier transform, and N is the quantity of columns in the matrix of the extended Fourier transform.

In a possible design solution, the first signal may include a plurality of pilot blocks, phases of the plurality of pilot blocks are obtained through phase rotation, and phases of any two of the plurality of pilot blocks after rotation are different.

Optionally, the plurality of pilot blocks may be P pilot blocks, and a phase rotation amount of a $p^{th}$ pilot block in the P pilot blocks may meet the following relationship:

$$e^{-j\pi\mu p(p+1)/P}, 0 \le p \le P-1, \text{ and } 1 \le \mu \le P-1.$$

Optionally, the transceiver module 1501 may also include a sending module and a receiving module (not shown in FIG. 15). The sending module is configured to implement a sending function of the communication apparatus 1500, and the receiving module is configured to implement a receiving function of the communication apparatus 1500.

Optionally, the communication apparatus 1500 may further include a storage module (not shown in FIG. 15), and the storage module stores a program or instructions. When the processing module executes the program or the instructions, the communication apparatus 1500 is enabled to perform a function of the second device in the method shown in FIG. 4.

It should be understood that, the processing module in the communication apparatus 1500 may be implemented by a processor or a processor-related circuit component, and may be a processor or a processing unit; and the transceiver module may be implemented by a transceiver or a transceiver-related circuit component, and may be a transceiver or a transceiver unit.

It should be noted that, the communication apparatus 1500 may be a terminal or a network device, may be a chip (system) or another part or component that can be disposed in a terminal or a network device, or may be an apparatus including a terminal or a network device. This is not limited in the disclosure.

In addition, for technical effects of the communication apparatus 1500, refer to the corresponding technical effect in the method shown in FIG. 4. Details are not described herein again.

Figure 16:
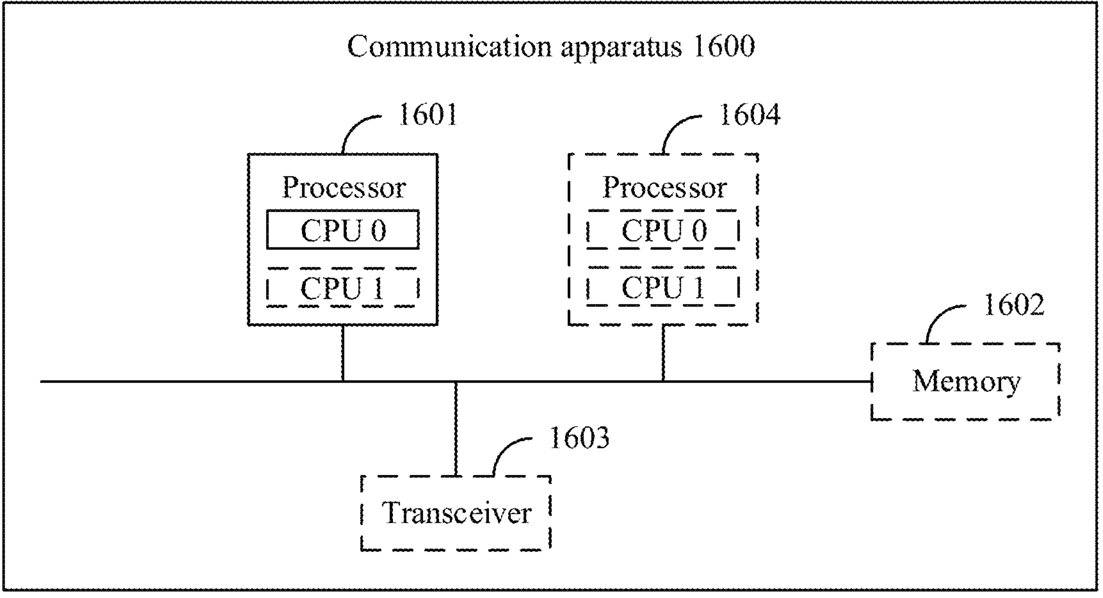
FIG. 16 is a second schematic diagram of a structure of a communication apparatus according to an embodiment of the disclosure.

For example, FIG. 16 is a second schematic diagram of a structure of a communication apparatus according to an embodiment of the disclosure. The communication apparatus may be a terminal device or a network device, or may be a chip (system) or another part of component that can be disposed in a terminal device or a network device. As shown in FIG. 16, the communication apparatus 1600 may include a processor 1601. Optionally, the communication apparatus 1600 may further include a memory 1602 and/or a transceiver 1603. The processor 1601 is coupled to the memory 1602 and the transceiver 1603, for example, may be connected by using a communication bus.

The following specifically describes the components of the communication apparatus 1600 with reference to FIG. 16.

The processor 1601 is a control center of the communication apparatus 1600, and may be a processor, may be a general name of a plurality of processing elements, or may be referred to as a logic circuit. For example, the processor 1601 is one or more central processing units (CPUs), or may be an application-specific integrated circuit (ASIC), or one or more integrated circuits configured to implement embodiments of the disclosure, for example, one or more microprocessors (DSPs) or one or more field programmable gate arrays (FPGAs).

Optionally, the processor 1601 may perform various functions of the communication apparatus 1600 by running or executing a software program stored in the memory 1602 and invoking data stored in the memory 1602.

During specific implementation, in an embodiment, the processor 1601 may include one or more CPUs, for example, a CPU 0 and a CPU 1 shown in FIG. 16.

During specific implementation, in an embodiment, the communication apparatus 1600 may alternatively include a plurality of processors, for example, the processor 1601 and a processor 1604 shown in FIG. 16. Each of the processors may be a single-core processor or may be a multi-core processor. The processor herein may be one or more devices, circuits, and/or processing cores configured to process data (for example, computer program instructions).

The memory 1602 is configured to store a software program for performing the solutions in the disclosure, and the processor 1601 controls execution of the software program, so that the method shown in FIG. 4 is performed.

Optionally, the memory 1602 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, this is not limited thereto. The memory 1602 may be integrated with the processor 1601, or may exist independently, and is coupled to the processor 1601 by using an interface circuit or an input/output interface (not shown in FIG. 16) of the communication apparatus 1600. This is not specifically limited in the embodiment of the disclosure.

The transceiver 1603 is configured to communicate with another communication apparatus. For example, the communication apparatus 1600 is a terminal, and the transceiver 1603 may be configured to communicate with a network device or communicate with another terminal device. For another example, the communication apparatus 1600 is a network device, and the transceiver 1603 may be configured to communicate with a terminal or communicate with another network device.

Optionally, the transceiver 1603 may include a receiver and a transmitter (not separately shown in FIG. 16). The receiver is configured to implement a receiving function, and the transmitter is configured to implement a sending function.

Optionally, the transceiver 1603 may be integrated with the processor 1601, or may exist independently, and is coupled to the processor 1601 by using an interface circuit (not shown in FIG. 16) of the communication apparatus 1600. This is not specifically limited in the embodiment of the disclosure.

It should be noted that, the structure of the communication apparatus 1600 shown in FIG. 16 does not constitute a limitation on the communication apparatus. An actual communication apparatus may include more or fewer parts than those shown in the figure, or combine some parts, or have different part arrangements.

In addition, for technical effects of the communication apparatus 1600, refer to the technical effects of the communication method in the foregoing method embodiments. Details are not described herein again.

Figure 17:
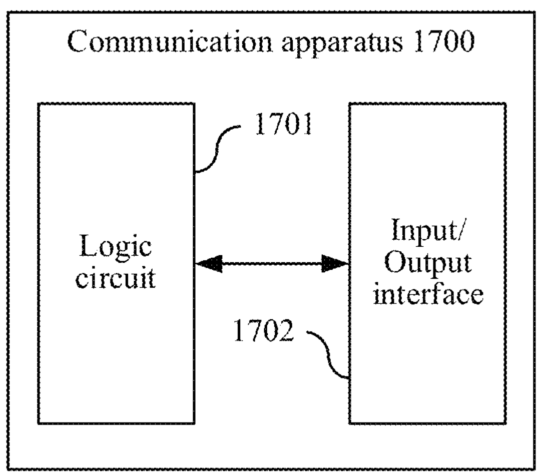
FIG. 17 is a third schematic diagram of a structure of a communication apparatus according to an embodiment of the disclosure.

For example, FIG. 17 is a third schematic diagram of a structure of a communication apparatus according to an embodiment of the disclosure. The communication apparatus may be a terminal device or a network device, or may be a chip (system) or another part of component that can be disposed in a terminal device or a network device. As shown in FIG. 17, the communication apparatus 1700 may include a logic circuit 1701 and an input/output interface 1702. The input/output interface 1702 is configured to receive code instructions and transmit the code instructions to the logic circuit 1701. The logic circuit 1701 is configured to run the code instructions to perform the method described above.

In addition, for technical effects of the communication apparatus 1700, refer to the technical effects of the communication method in the foregoing method embodiments. Details are not described herein again.

An embodiment of the disclosure provides a communication system. The communication system includes one or more of the foregoing terminals and one or more of the foregoing network devices.

It should be understood that, the processor in embodiments of the disclosure may be a CPU, or the processor may be another general-purpose processor, a DSP, an ASIC, a field programmable gate array FPGA or another programmable logic device, a discrete gate or transistor logic device, a discrete hardware component, or the like. The general-purpose processor may be a microprocessor, or the processor may be any conventional processor or the like.

It should be further understood that, the memory in embodiments of the disclosure may be a volatile memory or a nonvolatile memory, or may include both a volatile memory and a nonvolatile memory. The nonvolatile memory may be a ROM, a programmable read-only memory (PROM), an erasable programmable read-only memory (EPROM), an EEPROM, or a flash memory. The volatile memory may be a RAM, and is used as an external cache. Through an example description rather than a limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, a circuit), firmware, or any other combination. When software is used for implementation, the foregoing embodiments may be entirely or partially implemented in a form of a computer program product. The computer program product includes one or more computer instructions or computer programs. When the computer instructions or the computer programs or the instructions are loaded or executed on a computer, all or some of the procedures or functions according to embodiments of the disclosure are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, infrared, radio, or microwave) manner. The computer-readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, "A and/or B" may represent the following three cases: Only A exists, both A and B exist, and only B exists, where A and B may be singular or plural. In addition, the character "/" in this specification usually indicates an "or" relationship between associated objects, but may also indicate an "and/or" relationship. For details, refer to the context for understanding.

In the disclosure, "at least one" means one or more, and "a plurality of" means two or more. "At least one of the following items" or a similar expression thereof means any combination of these items, including a singular item or any combination of plural items. For example, at least one of a, b, or c may indicate a, b, c, a-b, a-c, b-c, or a-b-c, where a, b, and c may be singular or plural.

It should be understood that, in various embodiments of the disclosure, sequence numbers of the foregoing processes do not mean execution sequences. The execution sequences of the processes should be determined by functions and internal logic of the processes, and shall not constitute any limitation on implementation processes of embodiments of the disclosure.

A person of ordinary skill in the art may be aware that, the units and the algorithm steps in the examples described with reference to embodiments disclosed in this specification can be implemented by electronic hardware or a combination of computer software and electronic hardware. Whether the functions are performed by hardware or software depends on particular disclosures and design constraint conditions of the technical solutions. A skilled person may use different methods to implement the described functions for each particular disclosure, but this implementation should not be considered as beyond the scope of the disclosure.

It may be clearly understood by a person skilled in the art that, for convenient and brief description, for specific working processes of the system, apparatus, and unit described above, refer to corresponding processes in the foregoing method embodiments. Details are not described herein again.

In the several embodiments provided in the disclosure, it should be understood that the disclosed system, apparatus, and method may be implemented in other manners. For example, the apparatus embodiments described above are merely examples. For example, division into the units is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in an electrical form, a mechanical form, or another form.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, functional units in embodiments of the disclosure may be integrated into one processing unit, each of the units may exist alone physically, or two or more units may be integrated into one unit.

When the function is implemented in a form of a software functional unit and sold or used as an independent product, the function may be stored in a computer-readable storage medium. Based on such an understanding, the technical solutions in the disclosure essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of the disclosure. The foregoing storage medium includes any medium that can store program code, such as a USB flash drive, a removable hard disk, a ROM, a RAM, a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A communication method implemented by a first apparatus, comprising:

generating a first signal, wherein the first signal is a signal obtained by performing deceleration modulation on a symbol, and a time interval between two symbols that undergo deceleration modulation is greater than a time interval between the two symbols that do not undergo deceleration modulation; and sending the first signal, wherein the first signal is a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

2. The method according to claim 1, wherein the first signal, the matrix of the extended Fourier transform, and the symbol meet the following relationship:

$$s(t) = \sum_{k=-\frac{K}{2}}^{\frac{K}{2}-1} \sum_{n=0}^{N-1} a_n e^{-j2\pi kf(n)} e^{j2\pi k\Delta ft}; \text{ and}$$

$$-T_{cp} \leq t < T_{sym},$$

wherein $s(t)$ is the first signal, K is the quantity of rows in the matrix of the extended Fourier transform, N is the quantity of columns in the matrix of the extended Fourier transform, $a_n$ is an $n^{th}$ symbol, $e^{-j2\pi kf(n)}$ is an element in the matrix of the extended Fourier transform, f(n)=n/N or f(n)=[nK/N]'/K, [ ]' is rounding, Δf is a subcarrier spacing, $T_{cp}$ is duration corresponding to a cyclic prefix in the first signal, and $T_{sym}$ is duration corresponding to an original signal in the first signal.

3. The method according to claim 1, wherein the first signal is a signal obtained by performing deceleration modulation and phase rotation modulation on the symbol based on the matrix of the extended Fourier transform, and phase rotation amounts of different signals are different.

4. The method according to claim 3, wherein the first signal comprises an $m^{th}$ signal in M signals, and a phase rotation amount of the first signal meets the following relationship:

$$\mathrm{diag}\{1, e^{-j2\pi m/MN}, \ldots, e^{-j2\pi m(K-1)/MN}\}$$

wherein K is the quantity of rows in the matrix of the extended Fourier transform, N is the quantity of columns in the matrix of the extended Fourier transform, and M is an integer.

5. The method according to claim 4, wherein the first signal comprises P pilot blocks, and a phase rotation amount of a $p^{th}$ pilot block in the P pilot blocks meets the following relationship:

$$e^{-j\pi\mu p(p+1)/P}, 0 \leq p \leq P-1, \text{ and } 1 \leq \mu \leq P-1.$$

6. The method according to claim 1, wherein the first signal comprises a plurality of pilot blocks, phases of the plurality of pilot blocks are obtained through phase rotation, and phases of any two of the plurality of pilot blocks after rotation are different.

7. An apparatus, comprising:

one or more processors configured to:

generate a first signal, wherein the first signal is a signal obtained by performing deceleration modulation on a symbol, and a time interval between two symbols that undergo deceleration modulation is greater than a time interval between the two symbols that do not undergo deceleration modulation; and send the first signal, wherein the first signal is a signal obtained by performing deceleration modulation on the symbol based on a pulse shaping filter, and wherein the first signal, the pulse shaping filter, and the symbol meet the following relationship:

$$s(t) = \sum_{n=-CP}^{N-1} a_{n \bmod N} g(t - \alpha nT),$$

wherein $s(t)$ is the first signal, $g(t)$ is an impulse response function of the pulse shaping filter, $a_n$ is an $n^{th}$ symbol, CP is an integer, n is an integer ranging from—$CP$ to $N-1$, a value of $\alpha$ is greater than 1, $T$ is a time interval between two adjacent symbols, and $t$ is a time variable.

8. The apparatus according to claim 7, wherein the first signal comprises a plurality of pilot blocks, phases of the plurality of pilot blocks are obtained through phase rotation, and phases of any two of the plurality of pilot blocks after rotation are different.

9. A non-transitory computer-readable storage medium, wherein the non-transitory computer-readable storage medium comprises a computer program or instructions, and when the computer program or the instructions are run on a computer, cause the computer to:

generate a first signal, wherein the first signal is a signal obtained by performing deceleration modulation on a symbol, and a time interval between two symbols that undergo deceleration modulation is greater than a time interval between the two symbols that do not undergo deceleration modulation; and send the first signal, wherein the first signal is a signal obtained by performing deceleration and spectrum shifting modulation on the symbol based on the pulse shaping filter, and wherein the first signal, the pulse shaping filter, and the symbol meet the following relationship:

$$s(t)=\sum_{n=-CP}^{N-1} a_{nmodN} g(t-\alpha nT)\cos\pi(t-\alpha nT)/T_g,$$

wherein s(t) is the first signal, g(t) is an impulse response function of the pulse shaping filter, $\alpha_n$ is an $n^{th}$ symbol, CP is an integer, n is an integer ranging from—CP to N-1, a value of $\alpha$ is greater than 1,T is a time interval between two adjacent symbols, t is a time variable, and $T_g$ is pulse duration of the pulse shaping filter.

10. The non-transitory computer-readable storage medium according to claim 9, wherein the first signal comprises a plurality of pilot blocks, phases of the plurality of pilot blocks are obtained through phase rotation, and phases of any two of the plurality of pilot blocks after rotation are different.

11. A communication method, wherein the method is applied to a first apparatus and the method comprises:

generating a first signal, wherein the first signal is a signal obtained by performing deceleration modulation on a symbol, and a time interval between two symbols that undergo deceleration modulation is greater than a time interval between the two symbols that do not undergo deceleration modulation; and sending the first signal;

wherein the first signal is a signal obtained by performing deceleration modulation on the symbol based on a pulse shaping filter;

wherein the first signal, the pulse shaping filter, and the symbol meet the following relationship:

$$s(t)=\sum_{n=-CP}^{N-1} a_{nmodN} g(t-\alpha nT),$$

wherein $s(t)$ is the first signal, $g(t)$ is an impulse response function of the pulse shaping filter, $\alpha_n$ is an $n^{th}$ symbol, CP is an integer, n is an integer ranging from—$CP$ to $N\text{-}1$, a value of $\alpha$ is greater than 1, $T$ is a time interval between two adjacent symbols, and $t$ is a time variable.

12. A communication method, wherein the method is applied to a first apparatus and the method comprises:

generating a first signal, wherein the first signal is a signal obtained by performing deceleration modulation on a symbol, and a time interval between two symbols that undergo deceleration modulation is greater than a time interval between the two symbols that do not undergo deceleration modulation; and sending the first signal;

wherein the first signal is a signal obtained by performing deceleration and spectrum shifting modulation on the symbol based on the pulse shaping filter;

wherein the first signal, the pulse shaping filter, and the symbol meet the following relationship:

$$s(t)=\sum_{n=-CP}^{N-1} a_{nmodN} g(t-\alpha nT)\cos\pi(t-\alpha nT)/T_g,$$

wherein s(t) is the first signal, g(t) is an impulse response function of the pulse shaping filter, $\alpha_n$ is an $n^{th}$ symbol, CP is an integer, n is an integer ranging from—CP to N-1, a value of $\alpha$ is greater than 1,T is a time interval between two adjacent symbols, t is a time variable, and $T_g$ is pulse duration of the pulse shaping filter.

13. An apparatus, comprising:

one or more processors configured to:

generating a first signal, wherein the first signal is a signal obtained by performing deceleration modulation on a symbol, and a time interval between two symbols that undergo deceleration modulation is greater than a time interval between the two symbols that do not undergo deceleration modulation; and sending the first signal;

wherein the first signal is a signal obtained by performing deceleration and spectrum shifting modulation on the symbol based on the pulse shaping filter;

wherein the first signal, the pulse shaping filter, and the symbol meet the following relationship:

$$s(t)=\sum_{n=-CP}^{N-1} a_{nmodN} g(t-\alpha nT)\cos\pi(t-\alpha nT)/T_g,$$

wherein s(t) is the first signal, g(t) is an impulse response function of the pulse shaping filter, $\alpha_n$ is an $n^{th}$ symbol, CP is an integer, n is an integer ranging from—CP to N-1, a value of $\alpha$ is greater than 1,T is a time interval between two adjacent symbols, t is a time variable, and $T_g$ is pulse duration of the pulse shaping filter.

14. An apparatus, comprising:

one or more processors configured to:

generate a first signal, wherein the first signal is a signal obtained by performing deceleration modulation on a symbol, and a time interval between two symbols that undergo deceleration modulation is greater than a time interval between the two symbols that do not undergo deceleration modulation; and send the first signal, wherein the first signal is a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

15. The apparatus according to claim 14, wherein the first signal, the matrix of the extended Fourier transform, and the symbol meet the following relationship:

$$s(t)=\sum_{k=-\frac{K}{2}}^{\frac{K}{2}-1}\sum_{n=0}^{N-1}a_n e^{-j2\pi kf(n)}e^{j2\pi k\Delta ft};$$

and $$-T_{cp}\le t<T_{sym},$$

wherein

S(t) is the first signal, K is the quantity of rows in the matrix of the extended Fourier transform, N is the quantity of columns in the matrix of the extended Fourier transform, $\alpha_n$ is an $n^{th}$ symbol, $e^{-j2\pi kf(n)}$ is an element in the matrix of the extended Fourier transform, $f(n)=n/N$ or $f(n)=[nK/N]/K$, [] is rounding, $\Delta f$ is a subcarrier spacing, $T_{cp}$ is duration corresponding to a cyclic prefix in the first signal, and $T_{sym}$ is duration corresponding to an original signal in the first signal.

16. The apparatus according to claim 14, wherein the first signal is a signal obtained by performing deceleration modulation and phase rotation modulation on the symbol based on the matrix of the extended Fourier transform, and phase rotation amounts of different signals are different.

17. The apparatus according to claim 16, wherein the first signal comprises an mth signal in M signals, and a phase rotation amount of the first signal meets the following relationship:

$$\mathrm{diag}\{1, e^{-j2\pi m/MN}, \ldots, e^{-j2\pi m(K-1)/MN}\}$$

wherein K is the quantity of rows in the matrix of the extended Fourier transform, N is the quantity of columns in the matrix of the extended Fourier transform, and M is an integer.

18. The apparatus according to claim 16, wherein the first signal comprises P pilot blocks, and a phase rotation amount of a $p^{th}$ pilot block in the P pilot blocks meets the following relationship:

$$e^{-j\pi\mu p(p+1)/P},\ 0\le p\le P-1, \text{ and } 1\le\mu\le P-1.$$

19. The apparatus according to claim 14, wherein the first signal comprises a plurality of pilot blocks, phases of the plurality of pilot blocks are obtained through phase rotation, and phases of any two of the plurality of pilot blocks after rotation are different.

20. A non-transitory computer-readable storage medium, wherein the non-transitory computer-readable storage medium comprises a computer program or instructions, and when the computer program or the instructions are run on a computer, cause the computer to:

generate a first signal, wherein the first signal is a signal obtained by performing deceleration modulation on a symbol, and a time interval between two symbols that undergo deceleration modulation is greater than a time interval between the two symbols that do not undergo deceleration modulation; and send the first signal, wherein the first signal is a signal obtained by performing deceleration modulation on the symbol based on extended Fourier transform, a quantity of rows in a matrix of the extended Fourier transform is greater than a quantity of columns in the matrix of the extended Fourier transform, the quantity of columns in the matrix of the extended Fourier transform is the same as a quantity of symbols, and the quantity of rows in the matrix of the extended Fourier transform is the same as a quantity of subcarriers.

21. The non-transitory computer-readable storage medium according to claim 20, wherein the first signal, the matrix of the extended Fourier transform, and the symbol meet the following relationship:

$$s(t)=\sum_{k=-\frac{K}{2}}^{\frac{K}{2}-1}\sum_{n=0}^{N-1}a_n e^{-j2\pi kf(n)}e^{j2\pi k\Delta ft};$$

and $$-T_{cp}\le t<T_{sym},$$

wherein

S(t) is the first signal, K is the quantity of rows in the matrix of the extended Fourier transform, N is the quantity of columns in the matrix of the extended Fourier transform, $\alpha_n$ is an $n^{th}$ symbol, $e^{-j2\pi kf(n)}$ is an element in the matrix of the extended Fourier transform, $f(n)=n/N$ or $f(n)=[nK/N]/K$, [] is rounding, $\Delta f$ is a subcarrier spacing, $T_{cp}$ is duration corresponding to a cyclic prefix in the first signal, and $T_{sym}$ is duration corresponding to an original signal in the first signal.

22. The non-transitory computer-readable storage medium according to claim 20, wherein the first signal is a signal obtained by performing deceleration modulation and phase rotation modulation on the symbol based on the matrix of the extended Fourier transform, and phase rotation amounts of different signals are different.

23. The non-transitory computer-readable storage medium according to claim 22, wherein the first signal comprises an $m^{th}$ signal in M signals, and a phase rotation amount of the first signal meets the following relationship:

$$\mathrm{diag}\{1, e^{-j2\pi m/MN}, \ldots, e^{-j2\pi m(K-1)/MN}\}$$

wherein K is the quantity of rows in the matrix of the extended Fourier transform, N is the quantity of columns in the matrix of the extended Fourier transform, and M is an integer.

24. The non-transitory computer-readable storage medium according to claim 23, wherein the first signal comprises P pilot blocks, and a phase rotation amount of a $p^{th}$ pilot block in the P pilot blocks meets the following relationship:

$$e^{-j\pi\mu p(p+1)/P},\ 0\le p\le P-1, \text{ and } 1\le\mu\le P-1.$$

25. The non-transitory computer-readable storage medium according to claim 20, wherein the first signal comprises a plurality of pilot blocks, phases of the plurality of pilot blocks are obtained through phase rotation, and phases of any two of the plurality of pilot blocks after rotation are different.

26. A non-transitory computer-readable storage medium, wherein the non-transitory computer-readable storage medium comprises a computer program or instructions, and when the computer program or the instructions are run on a computer, cause the computer to:

generate a first signal, wherein the first signal is a signal obtained by performing deceleration modulation on a symbol, and a time interval between two symbols that undergo deceleration modulation is greater than a time interval between the two symbols that do not undergo deceleration modulation; and send the first signal, wherein the first signal is a signal obtained by performing deceleration modulation on the symbol based on a pulse shaping filter;

wherein the first signal, the pulse shaping filter, and the symbol meet the following relationship:

$$s(t) = \sum_{n=-CP}^{N-1} a_{nmodN} g(t - \alpha nT),$$

wherein $s(t)$ is the first signal, $g(t)$ is an impulse response function of the pulse shaping filter, $\alpha n$ is an n$^{th}$ symbol, CP is an integer, n is an integer ranging from—$CP$ to $N$-1, a value of $\alpha$ is greater than 1, $T$ is a time interval between two adjacent symbols, and $t$ is a time variable.

* * * * *